United States Patent
Kotani et al.

(10) Patent No.: US 10,157,050 B2
(45) Date of Patent: Dec. 18, 2018

(54) METHOD FOR CONFIRMING CORRECTION PROGRAM AND INFORMATION PROCESSING APPARATUS

(71) Applicants: FUJITSU LIMITED, Kawaski-shi, Kanagawa (JP); TOYOTA JIDOSHA KABUSHIKI KAISHA, Toyota-shi, Aichi-ken (JP)

(72) Inventors: Seigo Kotani, Kobe (JP); Masato Suzuki, Chofu (JP); Hisashi Oguma, Kawasaki (JP)

(73) Assignees: FUJITSU LIMITED, Kawasaki-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 48 days.

(21) Appl. No.: 14/495,195

(22) Filed: Sep. 24, 2014

(65) Prior Publication Data
US 2015/0113520 A1 Apr. 23, 2015

(30) Foreign Application Priority Data
Oct. 18, 2013 (JP) .................................. 2013-217473

(51) Int. Cl.
G06F 21/57 (2013.01)
G06F 8/65 (2018.01)
G06F 8/654 (2018.01)

(52) U.S. Cl.
CPC .............. *G06F 8/65* (2013.01); *G06F 8/654* (2018.02); *G06F 21/57* (2013.01)

(58) Field of Classification Search
CPC ............ G06F 8/65–8/70; G06F 21/57–21/577
See application file for complete search history.

(56) References Cited

U.S. PATENT DOCUMENTS 8,166,341 B2 4/2012 DeHaan et al.
2002/0170052 A1* 11/2002 Radatti ................. G06F 21/564
717/171

(Continued)

FOREIGN PATENT DOCUMENTS

JP 2004-102379 4/2004
JP 2005-107803 4/2005

(Continued)

OTHER PUBLICATIONS

Nilsson, Dennis K., Lei Sun, and Tatsuo Nakajima. "A framework for self-verification of firmware updates over the air in vehicle ECUs." GLOBECOM Workshops, 2008 IEEE. (Year: 2008)*

(Continued)

*Primary Examiner* — Chameli Das
*Assistant Examiner* — Joanne G Macasiano
(74) *Attorney, Agent, or Firm* — Staas & Halsey LLP

(57) ABSTRACT

A method includes receiving first information that is information on a control program from a control unit which executes the control program for controlling equipment loaded onto an automobile, the control unit being loaded onto the automobile, calculating second information that is a state of the control program when applying a correction program on the control program to the control unit on the basis of the received first information, transmitting the correction program to the control unit, receiving from the control unit third information that is information on a state of the control program after applying the transmitted correction program to the control unit, comparing the received third information with the calculated second information, and judging whether or not processing of applying the correction program to the control unit has succeeded on the basis of a result of the comparison.

13 Claims, 21 Drawing Sheets

(56) References Cited

U.S. PATENT DOCUMENTS

| | | | |
|---|---|---|---|
| 2005/0071838 A1 | 3/2005 | Hatasaki | |
| 2008/0086652 A1* | 4/2008 | Krieger et al. | 713/330 |
| 2008/0222604 A1* | 9/2008 | Murphy | 717/120 |
| 2010/0199078 A1* | 8/2010 | Shih et al. | 713/2 |
| 2010/0257517 A1* | 10/2010 | Sriram | G06F 8/68 |
| | | | 717/168 |
| 2011/0055636 A1 | 3/2011 | DeHaan et al. | |
| 2011/0239210 A1* | 9/2011 | Kotani et al. | 717/171 |
| 2011/0296390 A1* | 12/2011 | Vidal et al. | 717/168 |
| 2011/0320089 A1* | 12/2011 | Lewis | 701/32 |
| 2015/0309784 A1* | 10/2015 | Molin | G06F 8/65 |
| | | | 701/71 |
| 2015/0355896 A1* | 12/2015 | Benge | H04L 67/34 |
| | | | 717/171 |

FOREIGN PATENT DOCUMENTS

| | | |
|---|---|---|
| JP | 2006-331185 | 12/2006 |
| JP | 2009-157732 | 7/2009 |
| JP | 2010-128844 | 6/2010 |
| JP | 2011-108167 | 6/2011 |

OTHER PUBLICATIONS

Nilsson, Dennis K., and Ulf E. Larson. "Secure firmware updates over the air in intelligent vehicles." Communications Workshops, 2008. ICC Workshops' 08. IEEE International Conference on. (Year: 2008)*

Extended European Search Report dated Mar. 20, 2015 in corresponding European Patent Application No. 14185730.0.

Office Action in Chinese Patent Application No. 201410525010.7 dated Mar. 27, 2017.

* cited by examiner

FIG. 5

| NAME OF SOFTWARE /41 | MANUFACTURER /42 | TYPE /43 | HASH VALUE /44 | HASH VALUE ACQUIRING METHOD /45 | SOFTWARE ENTITY /46 | REGISTRATION DATE /47 |
|---|---|---|---|---|---|---|
| A-FF03 | CORPORATION A | FOR ECU201 | 75BCD15... | ACQUIRE ADDRESS X BY SHA1 | A6CD8EE... | 20120110 |
| B-TT77 | CORPORATION B | FOR ECU202 | 9A213451... | ACQUIRE ADDRESS Y BY SHA1 | B84255AE... | 20120110 |

| NAME OF SOFTWARE /41 | MANUFACTURER /42 | TYPE /43 | HASH VALUE /44 | HASH VALUE ACQUIRING METHOD /45 | SOFTWARE ENTITY /46 | REGISTRATION DATE /47 |
|---|---|---|---|---|---|---|
| A-FF04 | CORPORATION A | FOR ECU201 | AA04C34... | ACQUIRE ADDRESS X BY SHA1 | 28CD9DE... | 20121130 |
| B-TT77 | CORPORATION B | FOR ECU202 | 9A213451... | ACQUIRE ADDRESS Y BY SHA1 | B84255AE... | 20120110 |

FIG. 7

| NAME OF SOFTWARE | MANUFACTURER | TYPE | HASH VALUE | HASH VALUE ACQUIRING METHOD | SOFTWARE ENTITY | REGISTRATION DATE |
|---|---|---|---|---|---|---|
| A-FF04 | CORPORATION A | FOR ECU201 | AA04C34... | ACQUIRE ADDRESS X BY SHA1 | 28CD9DE... | 20121130 |
| B-TT78 | CORPORATION B | FOR ECU202 | 23A847A... | ACQUIRE ADDRESS Y BY SHA1 | C83987A... | 20121130 |

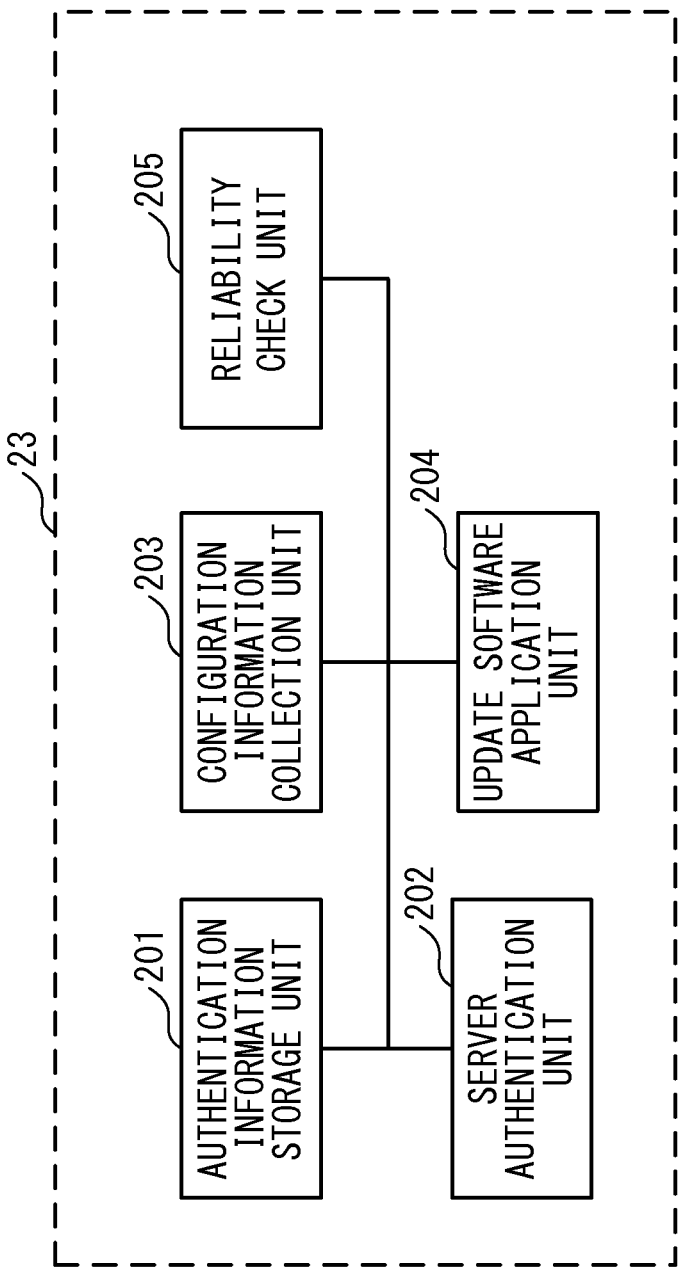
F I G. 1 2

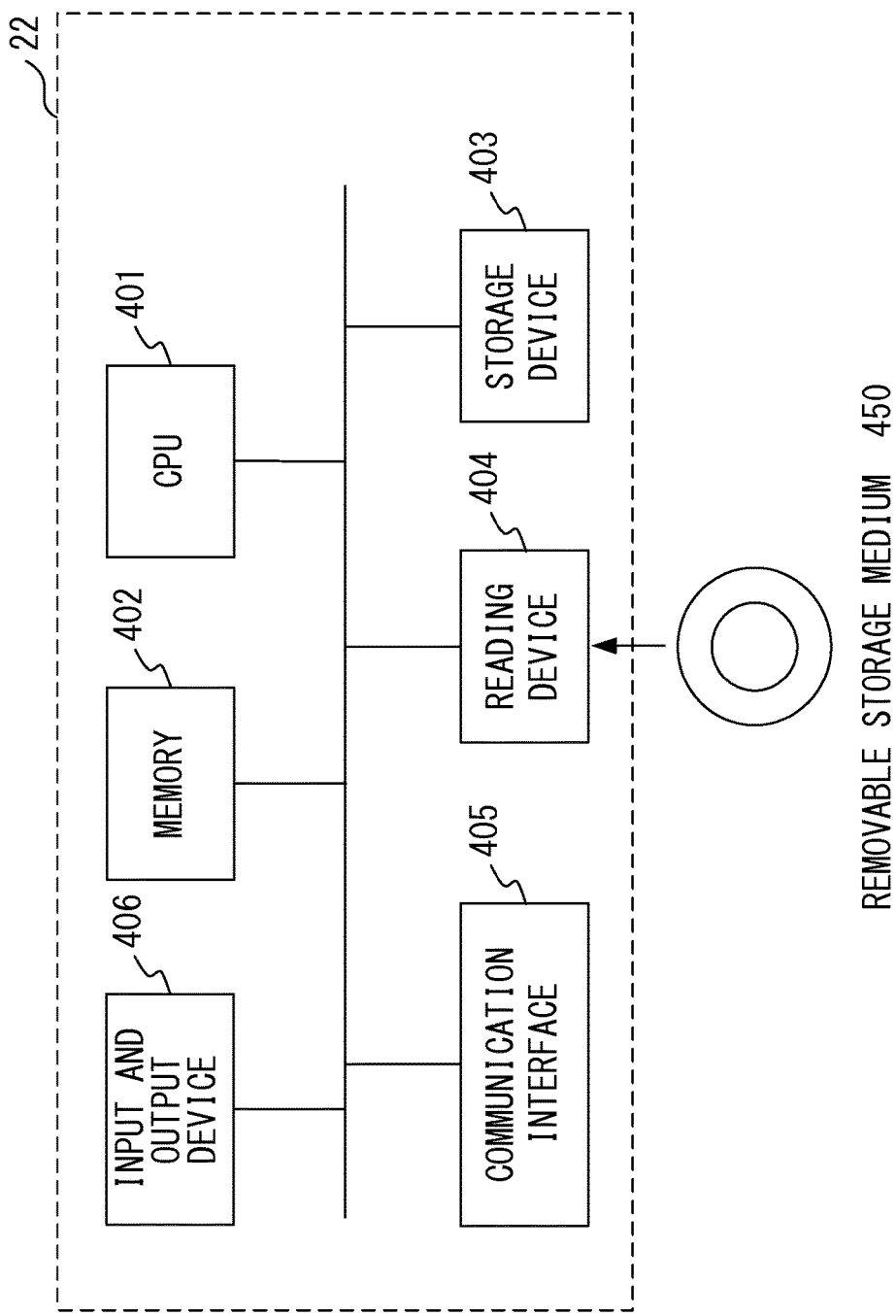
F I G. 1 7

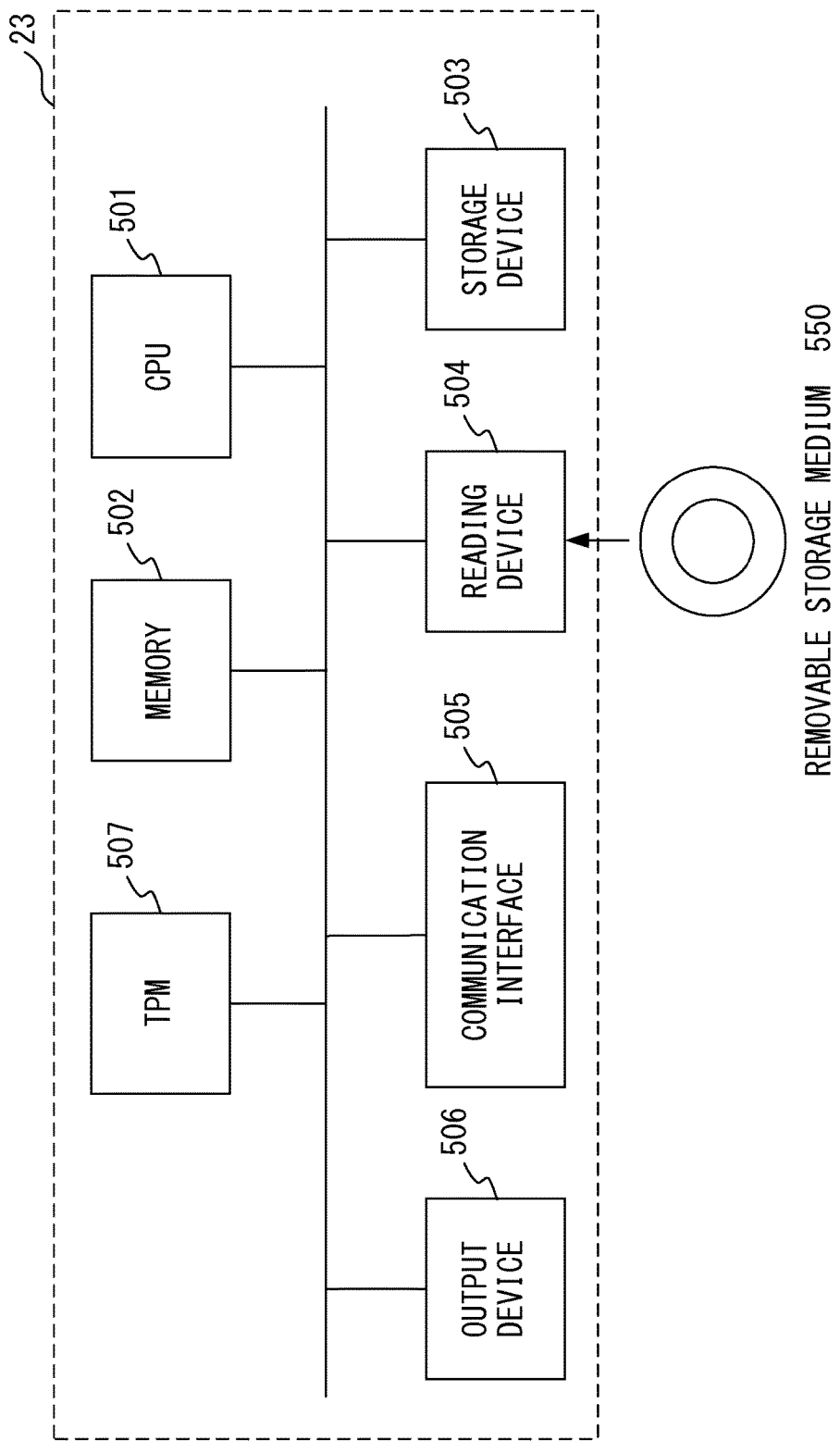
F I G. 18

METHOD FOR CONFIRMING CORRECTION PROGRAM AND INFORMATION PROCESSING APPARATUS

CROSS-REFERENCE TO RELATED APPLICATION

This application is based upon and claims the benefit of priority of the prior Japanese Patent Application No. 2013-217473, filed on Oct. 18, 2013, the entire contents of which are incorporated herein by reference.

FIELD

The embodiments discussed herein are related to a method for updating software via a network.

BACKGROUND

Examples of methods for updating software of an information processor include a method in which an information processor acquires update software from an update server connected via a network and applies the acquired update software thereto. Examples of methods for updating software via a network include the following two, first and second technologies.

In the first technology, at first, in a vendor system, user system information that includes software information and hardware information installed in a user system is acquired. Next, a test environment is constructed on the basis of the acquired user system information, the operation of the system to which a software update patch is applied is verified in the test environment, and whether or not the system operates normally in the test environment is confirmed. When the normal operation is confirmed, the software update patch is transmitted to the user system, and the user system updates its own system by applying the software update patch.

In the second technology, customer system information including information indicating an OS (Operating System) and an application introduced to a customer system and patch detail information including exclusive conditions that are conditions specifying the OS and application to which the patch may be applied, are retained. Then, validity or invalidity of applying the patch to the customer system is decided on the basis of the customer system information and the patch detail information. When it is decided that applying the patch is valid, the patch is transmitted to the customer system, and the instruction to apply the patch is issued.

The technologies described in each of the following documents are known.

Japanese Laid-Open Patent Application Publication No. 2005-107803

Japanese Laid-Open Patent Application Publication No. 2004-102379

SUMMARY

According to an aspect of the embodiments, a method is provided for confirming a correction program executed by a computer, the method including: receiving first information that is information on a control program from a control unit which executes the control program for controlling equipment loaded onto an automobile, the control unit being loaded onto the automobile; calculating second information that is a state of the control program when applying a correction program on the control program to the control unit on the basis of the received first information; transmitting the correction program to the control unit; receiving from the control unit third information that is information on a state of the control program after applying the transmitted correction program to the control unit; comparing the received third information with the calculated second information; and judging whether or not processing of applying the correction program to the control unit has succeeded on the basis of a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a configuration of a white list X.

FIG. 6 illustrates an example of a configuration of a white list Y.

FIG. 7 illustrates an example of a configuration of a white list Z.

FIG. 12 illustrates an example of a configuration of in-vehicle equipment according to the present embodiments.

FIG. 17 illustrates an example of a hardware configuration of an update server.

FIG. 18 illustrates an example of a hardware configuration of in-vehicle equipment.

DESCRIPTION OF EMBODIMENT

In operating software of an update target on an automobile, resources of a computer that is loadable into the automobile are poor, and therefore, it is difficult to secure the resources for recovery when update processing has failed. Further, it is desirable to reduce a load applied to the computer that is loaded into the automobile. Accordingly, it becomes important to confirm a success or failure in the update processing of software in a reliable manner.

However, the above mentioned first and second technologies do not disclose confirming the success or failure of the software operating on the automobile at an update server side.

Figure 1:
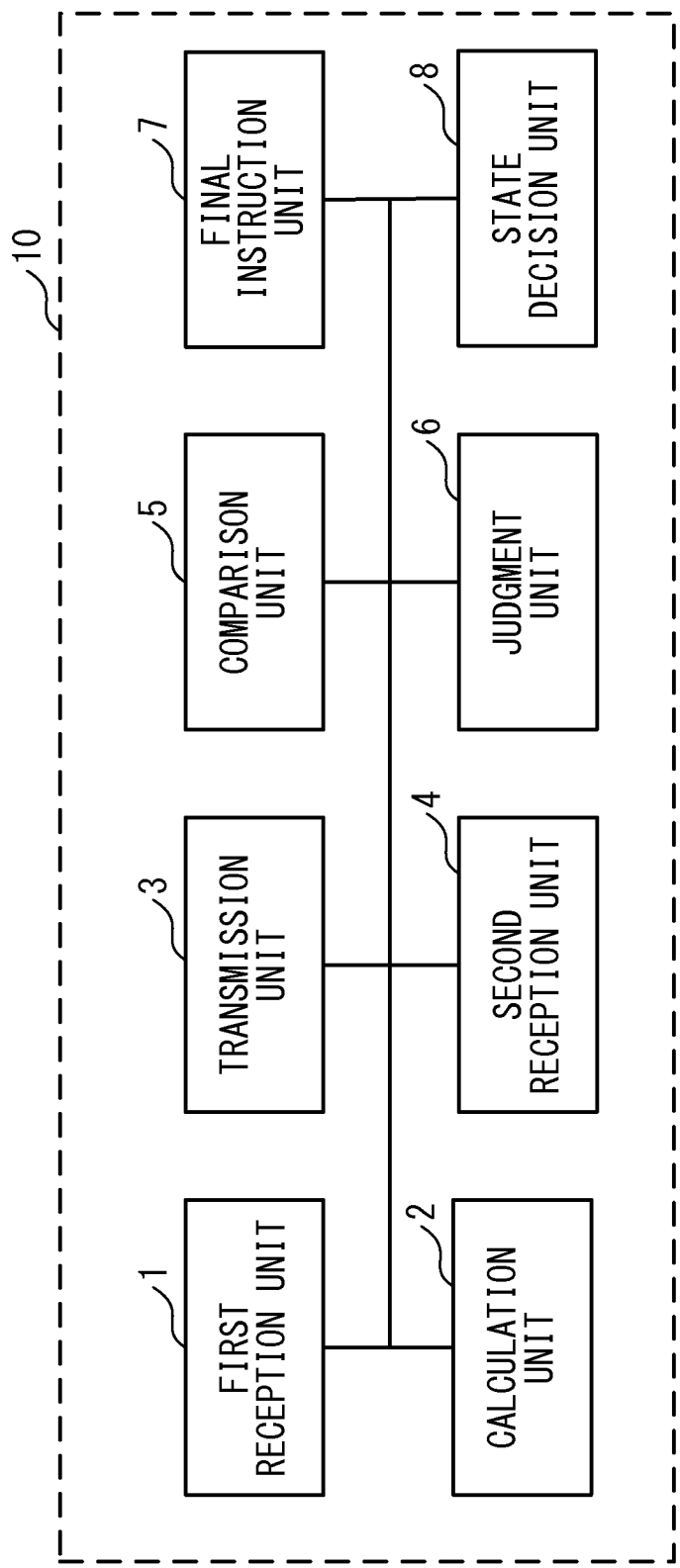
FIG. 1 is a functional block diagram which illustrates a configuration of an example of an information processor.

FIG. 1 is a functional block diagram which illustrates a configuration of an example of an information processor. In FIG. 1, an information processor 10 includes a first reception unit 1, a calculation unit 2, a transmission unit 3, a second reception unit 4, a comparison unit 5, a judgment unit 6, a final instruction unit 7, and a state decision unit 8.

A first reception unit 1 is a control unit that executes a control program to control equipment loaded onto an automobile, and receives, from the control unit that is loaded onto the automobile, first information that is information on a state of a control program.

A calculation unit 2 calculates second information that is a state of the control program when applying a correction program for the control program to the control unit on the basis of the received first information.

A transmission unit 3 transmits a correction program to the control unit.

A second reception unit 4 receives, from the control unit, third information that is information on a state of the control program when applying the transmitted correction program to the control unit.

A comparison unit 5 compares third information received by the second reception unit 4 with second information calculated by the calculation unit 2.

A judgment unit 6 judges whether or not processing of applying the correction program to the control unit has succeeded, on the basis of a result compared by the comparison unit 5.

A final instruction unit 7, when the judgment unit 6 judges that processing of applying the correction program to the control unit has succeeded, transmits, to the control unit, an instruction for validating the control program to which the correction program has been applied. The final instruction unit 7, when it is judged by the judgment unit 6 that processing of applying the correction program to the control unit has failed, transmits, to the control unit, an instruction for rolling back the processing of applying the correction program.

A state decision unit 8 decides whether or not a state of the control program is normal on the basis of the first information received by the first reception unit 1. The transmission unit 3 transmits the correction program to the control unit when the state decision unit 8 decides that the state of the control program is normal.

First information and third information is information prepared by software for which authenticity has been confirmed by a function that is loaded onto a TPM (Trusted Platform Module).

Figure 2:
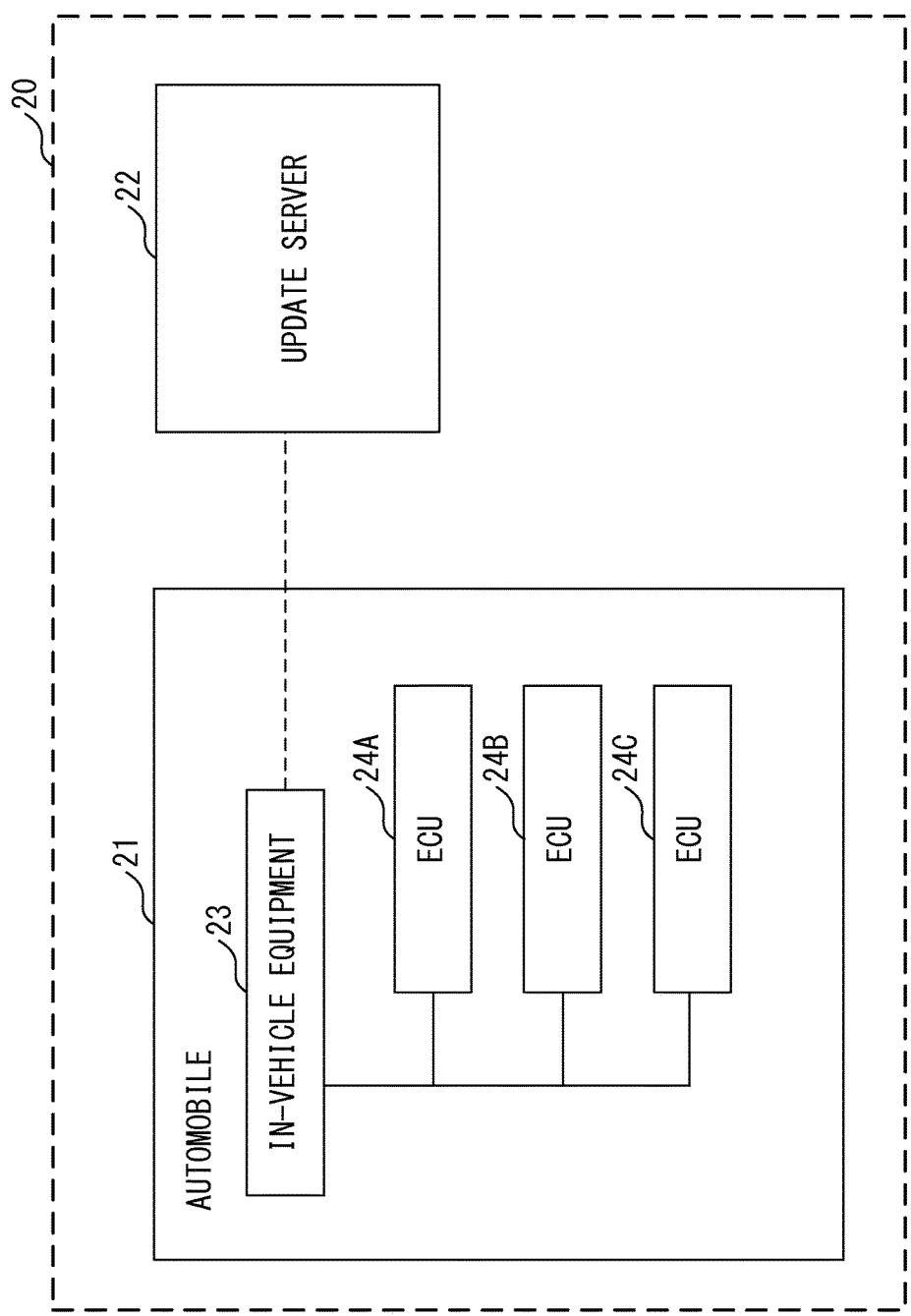
FIG. 2 illustrates an example of a configuration of an information processing system according to the present embodiments.

FIG. 2 illustrates an example of an update system of an ECU (Electronic Control Unit) that is loaded onto the automobile according to the present embodiments.

In FIG. 2, an update system 20 includes an automobile 21 and an update server 22. The automobile 21 includes in-vehicle equipment 23 and an ECU 24A, an ECU 24B, and an ECU 24C. The update server 22 and the in-vehicle equipment 23 are connected via a network. The in-vehicle equipment 23 and the ECU 24 are connected via a network or a bus. Examples of networks that connect the update server 22 and the in-vehicle equipment 23 include a wireless network, for example. Examples of networks that connect the ECU 24 and the in-vehicle equipment 23 include a CAN (Controller Area Network) and a FlexRay, for example. In the following explanations, when no particular distinction is made between ECUs 24A, 24B, and 24C, it is simply referred to as the ECU 24.

The in-vehicle equipment 23 is equipment which allows for information communications with the update server 22 via a network. The in-vehicle equipment 23 receives update software from the update server 22 and gives an instruction to apply the received update software to the ECU 24 of the update target. The in-vehicle equipment 23 further collects configuration information that indicates a state of software operating at each ECU, and transmits the configuration information to the update server 22. The in-vehicle equipment 23 is not particularly limited as long as it is able to communicate with the update server 22 and each ECU, and it may be a navigation device or a smart phone installable on the automobile 21.

The ECU 24 controls a sensor system which includes various kinds of sensors used for controlling an engine, and an engine operation. The ECU 24, when receiving from the in-vehicle equipment 23 an instruction to collect configuration information, acquires its own configuration information and reports it to the in-vehicle equipment 23. The ECU 24 further receives from the in-vehicle equipment 23 an instruction to update software, and updates its own software according to the instructed content. Updating of software is performed in two stages, namely, processing of installing update software and processing of validating the update software. Validating the update software is performed after the instruction from the update server 22 for validating the update has been received. Configuration information of software includes, for example, each type of parameter for software by which a normality of software is guaranteed when these parameters are normal.

The update server 22 transmits, to the in-vehicle equipment 23, a request to acquire the configuration information of the ECU 24, and receives, as a response thereto, the configuration information of the ECU 24. The update server 22 grasps a state of each ECU 24 of the automobile 21 on the basis of the received configuration information and selects the most appropriate update software. The update server 22, by using a real machine that has the configuration similar to the vehicle or a simulator that have been prepared according to the configuration information, calculates a white list in which values of the configuration information of each software when applying the selected software has succeeded, are stored. Then, the update server 22 transmits to the in-vehicle equipment 23 the instruction for applying the selected update software. After that, the update server 22 receives from the in-vehicle equipment 23 the configuration information after applying the update software, and decides whether or not the update of the software has succeeded, on the basis of the received configuration information and the white list. When deciding that the update of the software has succeeded, the update server 22 instructs the in-vehicle equipment 23 to validate the update software, and when deciding that the update of the software has failed, the update server 22 instructs the in-vehicle equipment 23 to roll back the update processing.

In the meantime, the update software may be the software with a format that is applied to the software in which a defect has been found, or may be the one with a format that is replaced with the software in which a defect has been found. Specifically, the update software is a software patch.

By employing such a configuration, the success or failure in the update of the software is decided by the update server 22, and when decided that the update has succeeded, the actual update is reflected, and accordingly, a reliability of the ECU 24 after the update is improved and any defect of the ECU 24 after the update may be prevented beforehand. Further, since the update server 22 selects the appropriate update software, a load for the ECU 24 and the in-vehicle equipment 23 caused by the update of the software of each ECU 24 of the automobile 21 may be reduced.

Figure 3:
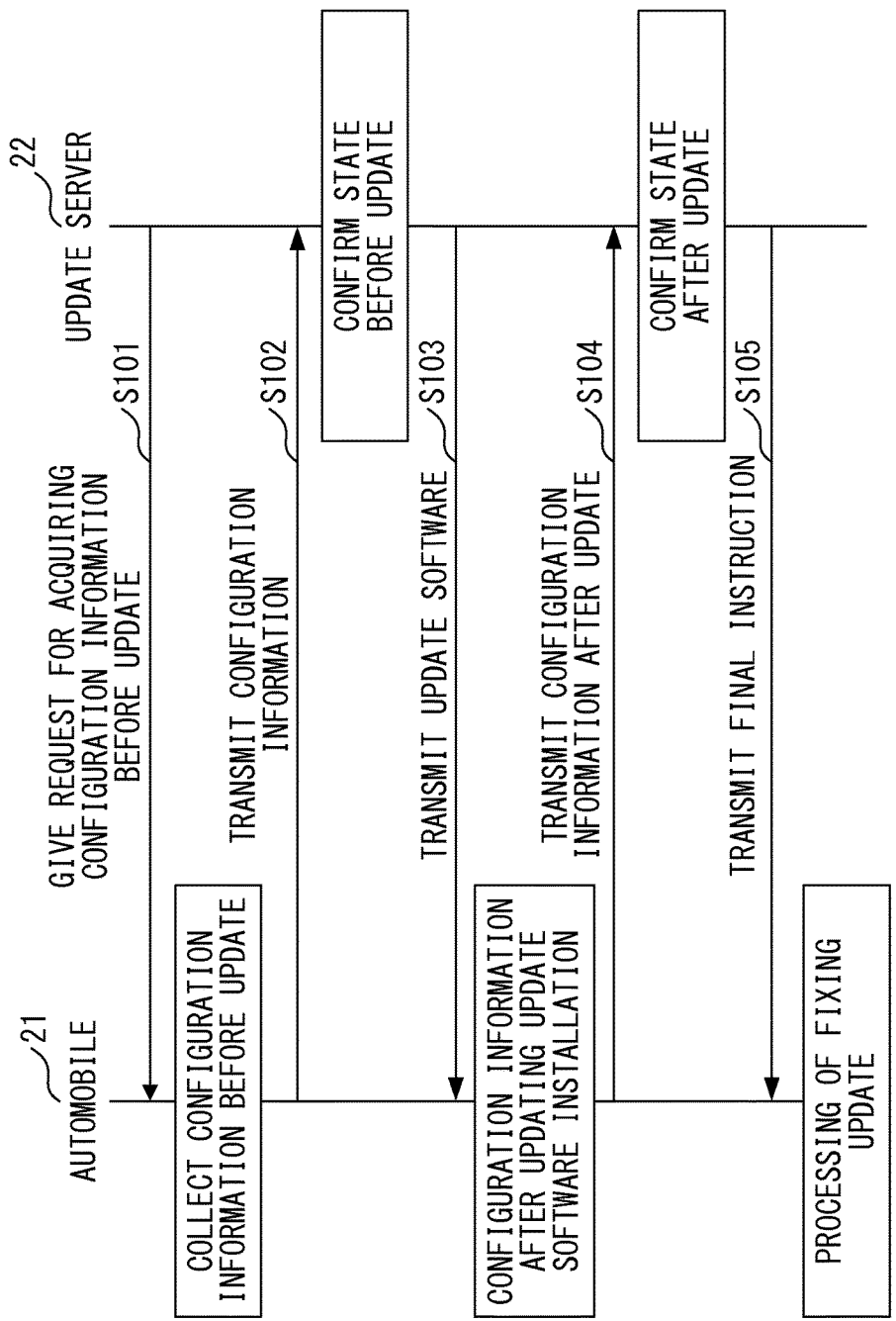
FIG. 3 illustrates an example of a sequence diagram of an automobile and an update server.

FIG. 3 illustrates an example of a sequence diagram of the automobile 21 and the update server 22 according to the present embodiments.

First, the update server 22 transmits to the automobile 21 the request to acquire the configuration information of the ECU 24 (S101). The automobile 21, when receiving the request to acquire the configuration information, collects the configuration information from each ECU 24 and transmits to the update server 22 the collected configuration information (S102). The update server 22, when receiving the configuration information, decides whether or not the software may be updated on the basis of the received configuration information. When deciding that the software may be updated, the update server 22 selects the update software and calculates the white list in which values of the configuration information of each unit of software are stored when applying the selected software has succeeded. Then, the update server 22 transmits the selected update software to the automobile 21 (S103). The automobile 21, when receiving the update software, performs processing of installing the software. At this point, however, the automobile 21 does not validate an update content of the software. Next, the automobile 21 acquires the configuration information after the processing of installing the update software and transmits it to the update server 22 (S104). The update server 22, when receiving the configuration information after processing of installing the update software, verifies whether or not the software has been updated normally by comparing the received configuration information with the values of the white list. Then, the update server 22 transmits a final instruction to the automobile 21 on the basis of the success or failure of the update of the software (S105). In the final instruction, the instruction for validating the update content is given when it is decided that the processing of installing the update software has been performed normally. On the other hand, in the final instruction, the instruction for rollback is given to the automobile 21 when it is decided that the processing of installing the update software has not been performed normally. The automobile 21, when receiving the final instruction, performs processing of fixing the update in accordance with the instructed content. Namely, the automobile 21 validates the update software when it receives the instruction to validate the update software, and the automobile 21 performs rollback when it receives the instruction for rollback.

Figure 4:
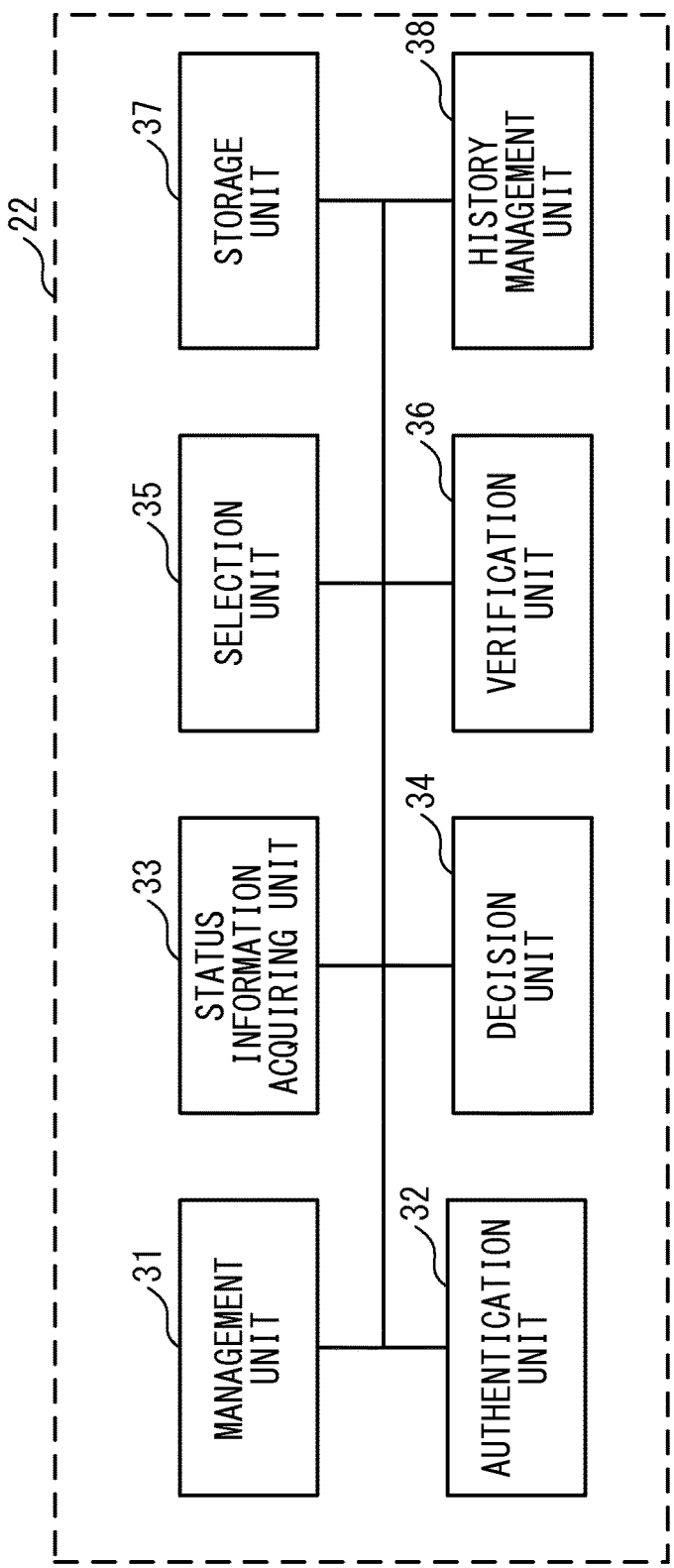
FIG. 4 illustrates an example of a configuration of an update server according to the present embodiments.

FIG. 4 illustrates an example of a configuration of the update server according to the present embodiments.

The update server 22 includes a management unit 31, an authentication unit 32, a status information acquiring unit 33, a decision unit 34, a selection unit 35, a verification unit 36, a storage unit 37, and a history management unit 38. The update server 22 is an example of an information processor 10. The status information acquiring unit 33 is an example of the first reception unit 1 and the second reception unit 4. The selection unit 35 is an example of the calculation unit 2 and the transmission unit 3. The verification unit 36 is an example of the comparison unit 5, the judgment unit 6, and the final instruction unit 7. The decision unit 34 is an example of the state decision unit 8.

The management unit 31 stores, in the storage unit 37, the configuration information of the software at a time before shipment of management target vehicles of the update server 22. In the following explanations, software management information in which the configuration information of the software of each ECU 24 before shipment is stored, is referred to as a white list X (40).

An example of a configuration of the white list X (40) is illustrated in FIG. 5. The white list X (40) includes data items including a name of software 41, a manufacturer 42, a type 43, a hash value 44, a hash value acquiring method 45, a software entity 46, and a registration date 47. It is assumed that the white list X (40) is managed for each vehicle.

The name of software 41 is the information for uniquely identifying the software that may be loaded onto a vehicle. The manufacturer 42 is the information of the name of a manufacturer of the software. The type 43 is the information that represents a type of the ECU 24 in which the software operates. The hash value 44 is the value acquired as a result of the hash value acquiring method 45 acquiring the hash value of the configuration information of the software. The hash value 44 is used for deciding whether or not the software is in a normal state. When the hash value of the configuration information acquired from the software matches up with the value of the hash value 44, the software is determined to be normal. The hash value acquiring method 45 is the method that is used in acquiring the hash value 44. The hash value acquiring method 45 further retains the in-vehicle equipment 23 as well, by associating it with the name of the software. The software entity 46 stores an entity of the software, namely, binary data of the software. The registration date 47 is the date on which the software of the record is registered in the software management information. In the software entity 46, an address of a storage area in which a real file of the software is stored may also be stored.

The management unit 31, when a defect has been found in the software, acquires the update software that is the software for correcting the software in which the defect has been found. The management unit 31 acquires, from the manufacturer of the software in which the defect has been found, the name of the update target software 41 and the update software, for example. Then, the management unit 31 prepares a new white list Y that is a copy of the white list X (40), and extracts, from the white list Y, a record that matches up with the name of the update target software 41 that has been acquired. Then, the management unit 31 updates information of each field of the extracted record to information of the acquired update software. The update software may be input from another information processor connected to the update server 22, or may be input by a user. The management unit 31 stores the prepared white list Y in the storage unit 37.

FIG. 6 illustrates an example of a configuration of the white list Y (50). The data structure of the white list Y (50) is similar to that of the white list X (40). In the example of FIG. 6, an example is shown in which the defect has been found for "A-FF03" that is the name of the software 41 in the white list X (40) of FIG. 5 and in which "A-FF04" has been acquired as the update software of the "A-FF03". In contrast to the white list X (40) of FIG. 5, in the white list Y (50) of FIG. 6, the record information with the name of the software 41 "A-FF03" is updated to the information of "A-FF04".

The management unit 31 further specifies a range of the software in which the software is affected when applying the update software to the software in which the defect has been found.

When defective software is corrected, output values of the software may change. Accordingly, the management unit 31 specifies the software that is affected when applying the update software, for example as follows. Here, for the purpose of explanation, a case is considered in which a defect is found in the specified software of ECU 24, and the software in which such a defect has been found is referred to as software X. The management unit 31 specifies the software (referred to as software Y) in which an output value from the software X, the output value changing in accordance with the correction of the software X, is defined as an input. The management unit 31 further specifies the software in which an output value from the software Y, the output value changing in accordance with the correction of the software X, is defined as an input. Similarly, the management unit 31 further specifies the software in which an output value from the newly specified software, the output value changing in accordance with the correction of the software X, is defined as an input. In this way, the management unit 31 specifies the software affected by the correction of the software X.

Further, the management unit 31 acquires externally, for each unit of the software affected by the correction of the software X, the update software of the software when the correction is necessary. Then, the management unit 31 further specifies the software that is affected for each of the acquired units of update software, and acquires, for each of the specified units of software, the update software, if the correction of the software is necessary.

In the following explanations, an assembly of the software specified by the management unit 31, in which the defect has been found, and the software affected by updating the software in which the defect has been found, and for which the correction is necessary, is referred to as an assembly of update target software.

Further, the management unit 31 prepares new management information in which the record of the software included in the assembly of update target software in the white list Y is updated to the information of the update software. In the following explanations, the new management information in which the record of the update target software in the white list Y is updated to the information of the update software is referred to as a white list Z. The management unit 31 stores the prepared white list Z in the storage unit 37.

FIG. 7 illustrates an example of a configuration of a white list Z. The data structure of the white list Z (60) is similar to that of the white list X (40). FIG. 7 illustrates an exemplary case in which a defect has been found in "A-FF03" in the example of the white list X (40) of FIG. 5, and the "A-FF03" is updated to "A-FF04". In this example, it is assumed that the "B-TT77" defines the output value of the "A-FF03" as an input, and that the "A-FF03" and "B-TT77" operate cooperatively. In this case, the management unit 31 decides that the "B-TT77" is the update target software, and outputs the decision result to the output device, for example. After that, as a result of a discussion between corporation A and corporation B that referred to the decision result, corporation B accepts the update of the "B-TT77" to address the current change and prepares the "B-TT78" that is the update software of the "B-TT77". It should be assumed that it is confirmed that a defect caused by the "A-FF03" occurs with the combination of the "A-FF03" and "B-TT77" and that the defect is resolved by updating each of the "A-FF03" and "B-TT77" to the "A-FF04" and "B-TT78", respectively at the same time. Then, the management unit 31 acquires the "B-TT78" for example from corporation B, and prepares the white list Z by updating the information of each field of the record in which the name of the software 41 of the white list Y is the "B-TT77" to the corresponding information of the "B-TT78".

A case may also be considered in which, unlike the above example, no defect occurs with a single unit of software but the defect occurs under a certain condition wherein the software is combined with the other units of software. A case may be further considered in which software versions differ in accordance with shipment time, even for the same types of vehicles. Therefore, the update target software may be determined in view of software versions or a relationship between software of the actual vehicles. In the present embodiment, the management unit 31 stores in the storage unit 37 the assembly of the update target software for each state of all the target vehicles to be assumed. Here, the states of all the target vehicles to be assumed refer to all of the assumed states in which the types of software operating in vehicles, versions, connection relationships between plural units of software, and the like are considered.

The white list Z (60) is prepared for each state of all of the target vehicles that are assumed. The values that have been verified by a real machine that reproduces each state of each of the assumed target vehicles or a simulator are stored in the values of the hash value 44 of the record of the update target software in the white list Z.

In preparing the white list Z (60), a common form may be prepared for each vehicle type, and after acquiring the status information of the update target vehicle, an accurate white list Z (60) may be prepared by using the real machine or a simulator, on the basis of the status information of the vehicle.

In the present embodiments, although the update software is applied in correcting the software, such update software may include programs that change setup values (parameters) of the software.

Further, in the configuration information that forms a basis of the hash value 44 of the record of the update software in the white lists Y (50) and Z (60), log information at the time of applying the update software, such as a return value at the time of applying the update software to the real machine or simulator, may be included.

The authentication unit 32 provides a mechanism for securing the communication security between the update server 22 and the in-vehicle equipment 23. Explanations for securing the communication security between the update server 22 and the in-vehicle equipment 23 are given later.

The status information acquiring unit 33 transmits, to a specified vehicle, a request to acquire the status information in which pieces of the configuration information of the software that operates in the vehicle are assembled. The status information acquiring unit 33 then receives the status information from the in-vehicle equipment 23 of the vehicle of the acquisition target.

Figure 8:
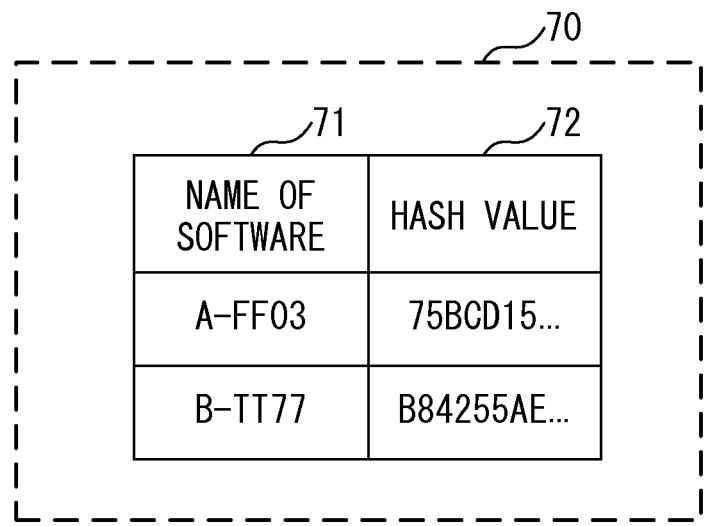
FIG. 8 illustrates an example of a data configuration of status information.

FIG. 8 illustrates an example of a data configuration of status information. The status information 70 includes the name of software 71 and the hash value 72. The name of software 71 is the information for uniquely identifying the software. The hash value 72 is the information of the hash value calculated from the configuration information by using a hash function.

The decision unit 34 decides whether or not the update software is applicable to the vehicle on the basis of the status information 70 received from the in-vehicle equipment 23. For example, when the update target software of the target vehicle is unlawfully altered, a new failure may occur when update processing is performed. In order to prevent such a case, prior to the update, it is confirmed whether or not the software loaded onto the vehicle is normal. When deciding that the update software is not applicable, the decision unit 34 instructs the in-vehicle equipment 23 to display an alert. Contents of the alert display may include, for example, that remotely updating the software is not applicable or the contents may include some pieces of advice for calling back vehicles, or the like.

Specifically, the decision unit 34 decides, for example, with regard to the software of each update target, whether or not the hash value of the configuration information and the hash value 44 of the white list X (40) are matched. The decision unit 34 decides that the update software is applicable to the target vehicle when all of the hash values of the update target software are matched between the configuration information and the white list X (40). When some of the hash values of the update target software are not matched between the configuration information and the white list X (40), the decision unit 34 decides that the update software is not applicable to the target vehicle.

Further specifically, the decision unit 34 extracts, from the status information 70, a record in which the name of the software 71 is matched up with the name of the software of the update target software, for each unit of update target software. The decision unit 34 then decides whether or not the hash value 72 of the extracted record and the hash value 44 of the record in which the name of the software 41 is identical in the white list X (40) are identical. When it is confirmed that the hash values between the record of the status information 70 and the record of the white list X (40) are matched for all of the update target software, the decision unit 34 decides that the update software is applicable to the target vehicle.

Since the information that is stored in the white list X (40) is that at the time of shipment of the vehicle, when the software of the vehicle is updated to the latest version after the time of shipment, for example, the hash values may not be matched. Therefore, for example, the management unit 31 prepares the white list of all of the combinations of the assumed software loaded onto vehicles beforehand, the vehicles being judged as normal. The decision unit 34 may decide that the update software is applicable when all of the hash values of the corresponding software are matched as a result of comparing the configuration information acquired from the vehicle with the white lists.

The selection unit 35 selects the update target software and the white list Z (60) on the basis of the status information 70 and transmits to the in-vehicle equipment 23 the instruction to update the software. Namely, the selection unit 35 specifies the assembly of the update software that corresponds to the status of the target vehicle from among the assemblies of the update software that are associated for each of the states of all the assumed target vehicles and are stored in the storage unit 37, on the basis of the status information 70. Next, the selection unit 35 specifies the white list Z (60) that corresponds to the state of the target vehicle from among the white lists (60) prepared for each state of all the assumed target vehicles, on the basis of the status information 70. In the following explanations, "update target software" and "white list Z (60)" are assumed to refer to the "update target software" and "white list Z (60)" that are selected in accordance with the status information 70 of the update target vehicle.

Figure 9:
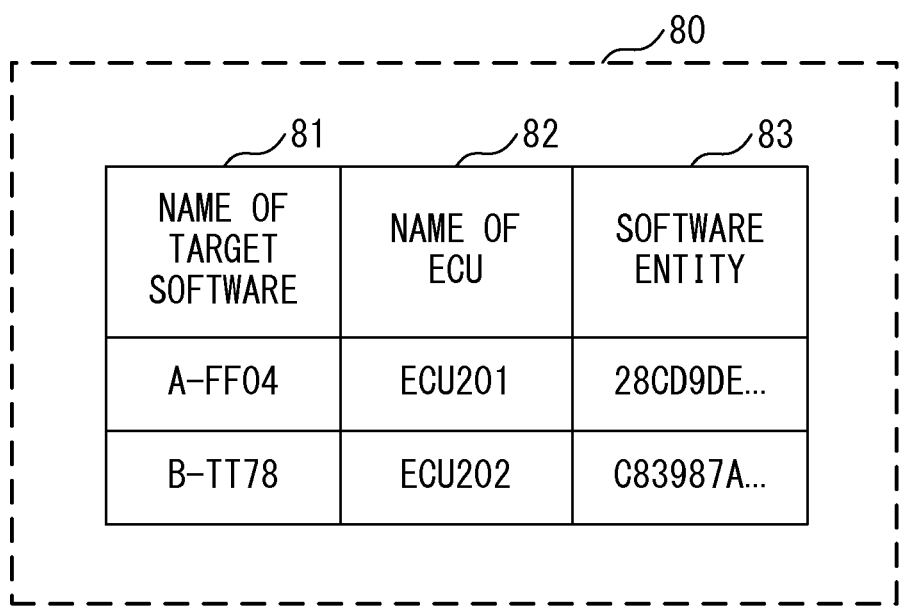
FIG. 9 illustrates an example of a data configuration of an update instruction.

FIG. 9 illustrates an example of the data configuration of the update instruction 80. The update instruction 80 includes data items including the name of the target software 81, the name of the ECU 82, and the update software entity 83. The name of the target software 81 is the information for uniquely identifying the update target software. The name of the ECU 82 is information for uniquely identifying the ECU 24 in which the target software operates. The update software entity 83 is the entity of the update software. The selection unit 35 prepares a record that corresponds to all the software included in the assemblies of the update target software and stores the record in the update instruction.

In an example of FIG. 9, the name of the target software 81, the name of the ECU 82, and the update software entity 83 are respectively stored in the update instruction 80 as the record of the entity of "A-FF03", "ECU 201", and "A-FF04". Further, the name of the target software 81, the name of the ECU 82, and the update software entity 83 are respectively stored in the update instruction 80 as the record of the entity of "B-TT77", "ECU 202", and "B-TT78".

The verification unit 36 verifies whether or not the update software has been installed (applied) normally. Specifically, the verification unit 36 performs verification by using the status information 70 transmitted from the in-vehicle equipment 23 after installing the update software and the information of the white list Z (60). The status information transmitted from the in-vehicle equipment 23 after applying the update software has the same format as that of the status information 70 of FIG. 8.

The verification unit 36 decides whether or not the hash value 72 of the update target software included in the received status information 70 matches up with the hash value 44 of the corresponding software of the white list Z (60). The verification unit 36 decides that the application of the update software of the target vehicle has been performed normally when all of the hash values of the update target software are matched between the record of the status information 70 and the record of white list Z (60). When some of the hash values of the update target software are not matched between the record of the status information 70 and the record of white list Z (60), the verification unit 36 decides that the application of the update software of the target vehicle has failed. Even when the verification unit 36 decides that the application has failed, it is possible that the verification unit 36 will decide again that the application has been normally performed when prescribed conditions are fulfilled. Such conditions include, for example, the one in which hash values are matched between the record of the status information 70 and the record of the white list Z (60) for all first type software, when there are two types of update target software, namely, first type software that affects travel by an automobile and second type software that does not directly affect the travel by the automobile.

Figure 10:
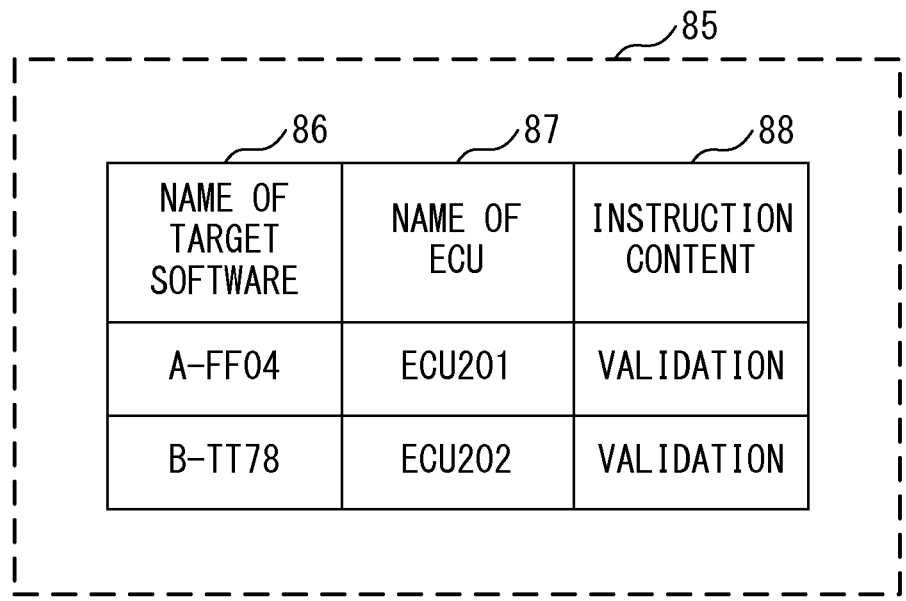
FIG. 10 illustrates an example of a data configuration of a final instruction.

The verification unit 36 transmits the final instruction to the in-vehicle equipment, in accordance with the decision result of the success or failure of installing the update software. FIG. 10 illustrates an example of the data configuration of the final instruction. In FIG. 10, the final instruction 85 includes data items including the name of the target software 86, the name of the ECU 87, and the instruction content 88. The name of the target software 86 is the information for uniquely identifying the update target software. The name of the ECU 87 is the information for uniquely identifying the ECU 24 in which the target software operates. The instruction content 88 is the instruction content for the target software. The verification unit 36 sets up validating the update in the instruction content 88, when the update of the software is decided to have succeeded. On the other hand, the verification unit 36 sets up, in the instruction content 88, rollback of the update processing, when the update of the software is decided to have failed. When the update is decided to have failed, the verification unit 36 may transmit the update instruction 80 again by transmitting the update software to the in-vehicle equipment 23 again, together with the instruction to roll back. The verification unit 36 prepares a record that corresponds to all of the software included in the assemblies of the update target software and stores the record in the final instruction 85.

The storage unit 37 stores the white list X (40), the white list Y (50), the white list Z (60), and the assembly of the update target software. The storage unit 37 further stores an installation work log of the update software.

The history management unit 38 receives, from the in-vehicle equipment 23, a work log of the update processing of the software and records the received work login the storage unit 37.

Next, explanations are given for securing the communication security between the in-vehicle equipment 23 and the update server 22.

In the present embodiment, in order to secure the communication security between the update server 22 and the in-vehicle equipment 23, encryption and digital signature are used. Pairs of a public key and a private key for the digital signature are generated for each combination of the update server and the in-vehicle equipment, and key pairs of the in-vehicle equipment are generated at the time of shipment of each of the vehicles. Encryption target data is encrypted by a public key of another party, and is decoded by its own private key. The digital signature is performed by the secret key respectively retained by the update server and the in-vehicle equipment. Therefore, there is a plurality of pairs of the public key and the private key, and with regard to a first pair (a key pair of the update server), the update server 22 retains the private key of the update server 22, and the in-vehicle equipment 23 retains the public key of the update server 22, and with regard to a second pair (a key pair of the in-vehicle equipment), the in-vehicle equipment 23 retains the private key of the in-vehicle equipment 23, and the update server 22 retains the public key of the in-vehicle equipment 23.

As the key pair of the in-vehicle equipment, the one prepared by the TPM included in each piece of in-vehicle equipment 23 may be used.

Figure 11:
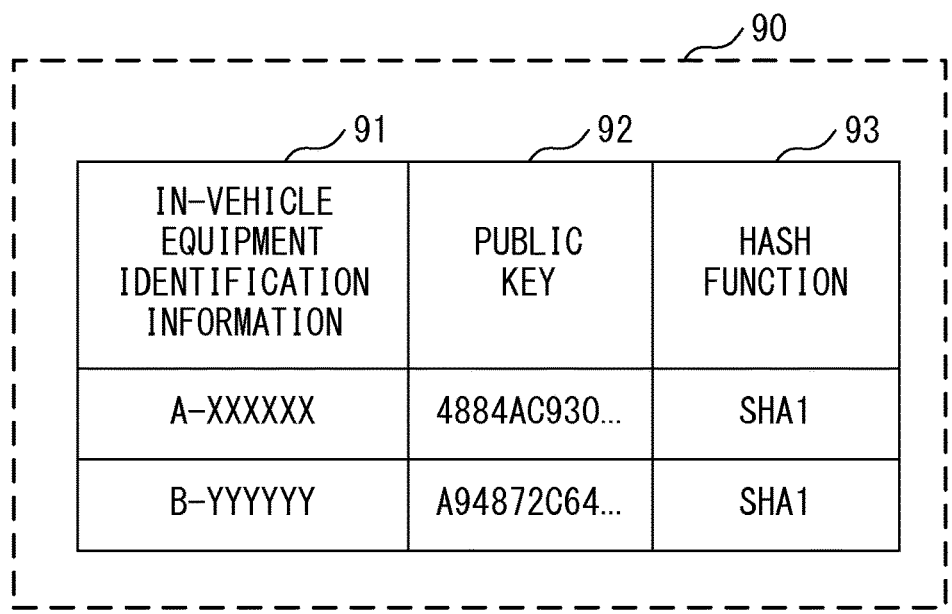
FIG. 11 illustrates an example of key management information for which an authentication unit manages a public key and a hash function of in-vehicle equipment.

The authentication unit 32 of the update server 22 retains the private key of the update server 22. The update server 22 further manages, for each piece of in-vehicle equipment, the public key of the in-vehicle equipment 23 and the hash function used in comparing the transmission data with the digital signature. FIG. 11 illustrates an example of key management information 90 for which the authentication unit 32 manages the public key of the in-vehicle equipment 23 and the hash function. The key management information 90 includes data items including the in-vehicle equipment identification information 91, the public key 92, and the hash function 93. The in-vehicle equipment identification information 91 is the identification information for uniquely identifying the in-vehicle equipment 23. The public key 92 is the information of the public key 92 of the in-vehicle equipment 23 that is identified by the in-vehicle equipment identification information 91. The public key 92 corresponds to the private key of the in-vehicle equipment 23 of the in-vehicle equipment identification information 91. The hash function 93 is used for comparing the transmission data with the digital signature. With regard to the hash function 93, the same hash function is stored in the in-vehicle equipment 23 of the in-vehicle equipment identification information 91 as well. These items are registered in the key management information 90 at the time as shipment of each vehicle.

Next, explanations are given for a method of using a digital signature, as an example of a method for authenticating the in-vehicle equipment 23 by the authentication unit 32 and for confirming the confidentiality of the data from the in-vehicle equipment 23. The method for authentication and for confirming confidentiality is not limited to the embodiment of using the digital signature to be explained hereinafter, but various methods may be used. Here, explanations are given for an example in which the data exchanged between the authentication unit 32 and the in-vehicle equipment 23 is encrypted.

In authentication, first, the in-vehicle equipment 23 calculates the hash value of the transmission target data by using the hash function that is stored in the in-vehicle equipment 23. Next, the in-vehicle equipment 23 encrypts the calculated hash value by using its own private key, and prepares the digital signature. Then, the in-vehicle equipment 23 encrypts the prepared digital signature and the transmission target data by using the public key of the server 22. Then, the in-vehicle equipment 23 transmits to the update server 22 the encrypted transmission target data and digital signature.

When receiving from the in-vehicle equipment 23 the encrypted transmission target data and digital signature, the authentication unit 32 decrypts the received information by using the private key of the server 22. Next, the authentication unit 32 acquires from the key management information 90 the public key 92 of the in-vehicle equipment 23, and acquires the hash value by decrypting the digital signature with the public key 92. Next, the authentication unit 32 acquires from the key management information 90 the hash function 93 that corresponds to the in-vehicle equipment 23 and calculates the hash value of the transmission target data by using the acquired hash value 93. Then, the authentication unit 32 compares the calculated hash value with the hash value acquired by decrypting the digital signature, and decides that the in-vehicle equipment 23 is authentic and that the data received from the in-vehicle equipment 23 is not falsified when the comparison results are matched.

In the meantime, for encrypting the data that is exchanged between the authentication unit 32 and the in-vehicle equipment 23, a hybrid encryption scheme in which a common key encryption and a public key encryption are combined may be used, or other various methods may be used as well.

Thus, the authentication unit 32 of the update server 22 authenticates the in-vehicle equipment 23 and confirms that information received from the in-vehicle equipment 23 is not falsified.

Next, explanations are given for the configuration of the in-vehicle equipment 23. FIG. 12 illustrates an example of a configuration of the in-vehicle equipment according to the present embodiments.

The in-vehicle equipment 23 includes an authentication information storage unit 201, a server authentication unit 202, a configuration information collection unit 203, an update software application unit 204, and a reliability check unit 205.

The authentication information storage unit 201 stores the public key of the update server 22, the private key of the in-vehicle equipment 23, and the hash function that are used for securing the communication security with the update server. The public key of the update server 22, the private key of the in-vehicle equipment 23, and the hash function are stored before shipment of vehicles. The private key of the in-vehicle equipment 23 and the hash function correspond to the public key 92 of the key management information 90 and the hash function 93.

The server authentication unit 202 secures the communication security between the update server 22 and the in-vehicle equipment 23. The authentication of the update server 22 and decision by the server authentication unit 202 that the information received from the update server 22 is not falsified are performed, similarly to the authentication of the in-vehicle equipment 23 by the above mentioned authentication unit 32. Namely, in authentication, first, the authentication unit 32 of the update server 22 calculates the hash value of the transmission target data by using the hash function. Next, the authentication unit 32 encrypts the calculated hash value by using the private key of the server 22, and prepares a digital signature. Then, the server 22 encrypts the prepared digital signature and the transmission target data by using the public key of the in-vehicle equipment 23. Then, the server 22 transmits to the in-vehicle equipment 23 the encrypted transmission target data and digital signature.

When receiving from the update server 22 the transmission target data and digital signature that have been encrypted, the server authentication unit 202 decrypts the received information by using the private key of the in-vehicle equipment 23. Next, the server authentication unit 202 decrypts the digital signature by using the public key of the server 22 and acquires the hash value. Next, the server authentication unit 202 calculates the hash value of the transmission target data by using the hash function that is stored in the authentication information storage unit 201. Then, the server authentication unit 202 compares the calculated hash value with the hash value acquired by decrypting the digital signature, and decides that the update server 22 is authentic and that the transmission target data received from the update server 22 is not falsified, when the comparison results are matched.

The configuration information collection unit 203 acquires the configuration information of the software of each ECU 24 of the vehicle, prepares the status information 70 on the basis of the acquired configuration information, and transmits it to the update server 22. Namely, the configuration information collection unit 203 first transmits to each ECU 24 the request to acquire the configuration information of the software. Subsequently, in response to this acquisition request, the configuration information collection unit 203 acquires the configuration information of the software from each ECU 24. Next, the configuration information collection unit 203 prepares the status information 70 from the acquired configuration information. Then, the configuration information collection unit 203 transmits the prepared status information 70 to the update server 22.

With regard to the preparation of the status information 70, specifically, the configuration information collection unit 203 prepares a record for the software that was received from each ECU 24. Then, the configuration information collection unit 203 stores, in the name of the software 71, the name of the software which corresponds to the configuration information that has been collected, and stores in the hash value 72 the hash value of the software calculated by using the hash value acquiring method 45 that is associated with the software.

Collecting the configuration information is performed when the configuration information acquiring request is received from the update server 22 and immediately after the processing of applying the software completes.

The update software application unit 204 receives the update instruction 80 of the software from the update server 22, and instructs each ECU 24 for which the instruction has been given by the update instruction 80 to update the software. Specifically, the update software application unit 204 associates the name of the target software 81 with the software entity 83 for the ECU 24 of the name of the ECU 82 of each record of the received update instruction 80, and transmits it.

Further, the update software application unit 204 receives the final instruction 85 from the update server 22, and transmits the instruction content to each ECU 24 that was instructed by the final instruction 85. Specifically, the update software application unit 204 associates the name of the target software 86 of the record with the instruction content 88 for the ECU 24 of the name of the ECU 87 of each record of the received final instruction 85, and transmits it. Further, the update software application unit 204 may display an alert to the user when the instruction content 88 of the final instruction 85 is rollback. The content of the alert display may include information that the update of the software has failed or an advice for calling back vehicles.

The reliability check unit 205 checks the authenticity of the application that operates in the in-vehicle equipment 23. Specifically, the reliability check unit 205 stores in the specified storage region the hash value for confirming the authenticity of each application that starts up at the in-vehicle equipment 23. Then, the reliability check unit 205 compares the above-mentioned hash value with the hash value for confirming the authenticity, the hash value having been stored after the acquisition of the hash value of the application at the time of starting up the application. When the hash values are matched, the reliability check unit 205 decides that the application is authentic. The application for which the authenticity is checked by the reliability check unit 205 includes the one that provides functions of the server authentication unit 202, the configuration information collection unit 203, and the update software application unit 204. Similarly, the reliability check unit 205 checks the authenticity of the application of the ECU 24 that communicates with the configuration information collection unit 203 on the basis of the comparison of the hash values. In the meantime, the functions of the reliability check unit 205 may be provided by the TPM. The TPM is a security chip that has hardware tamper resistance and may be used for securing the reliability of each application that checks the hash values, as a reliability standard.

The reliability check unit 205 may secure the reliability of the status information 70 that is transmitted to the update server 22 by the configuration information collection unit 203 to check the reliability of the configuration information collection unit 203 and the application of the ECU 24 which performs communications with the configuration information collection unit 203. Further, confidentiality of the status information 70 is secured by the digital signature. Accordingly, the security of the status information 70 which is received by the update server 22 from the in-vehicle equipment 23 is secured.

Figure 13:
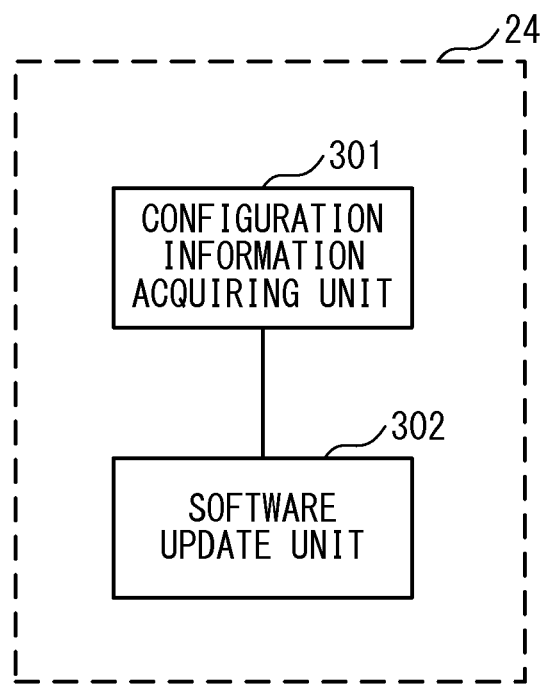
FIG. 13 illustrates an example of a configuration of an ECU according to the present embodiments.

Next, explanations are given for the configuration of the ECU 24. FIG. 13 illustrates an example of the ECU 24 according to the present embodiment.

The ECU 24 includes a configuration information acquiring unit 301 and a software update unit 302.

The configuration information acquiring unit 301 acquires the configuration information of the software which operates in the ECU 24, and transmits the acquired configuration information to the in-vehicle equipment 23. Acquiring the configuration information is performed when the configuration information acquiring request is received and immediately after the application processing of the software completes. The configuration information includes information of the name of the software for uniquely identifying the software and the configuration information associated with the name of the software.

The software update unit 302 receives from the in-vehicle equipment 23 the instruction to update the software. Then, the software update unit 302 installs the received update software. Namely, the software update unit 302 applies the update software to the software of the name of the target software that is included in the update instruction. However, in the application processing of the update software, it is assumed that validating the update (e.g., the starting-up by the updated software) is not performed but validating the software that is updated after receiving the validation instruction from the in-vehicle unit 23 is performed. When the software update unit 302 receives the rollback instruction from the in-vehicle equipment 23, the software update unit 302 discards the applied information and returns the software to a state immediately before the application processing.

Further, the software update unit 302 transmits the work log to the in-vehicle equipment 23. Here, the work log is the data of the work log of the installation processing by the software update unit 302 and of the validation processing or rollback processing subsequent to the installation processing.

Rollback processing may be realized by backing up (or acquiring a snapshot of) a state of the software immediately before the starting of the processing of installing the update software in a specified storage region. In this case, when receiving from the in-vehicle equipment 23 the update instruction of the software, first, the software update unit 302 acquires a backup of the update target software. When acquiring the backup has completed, the software update unit 302 installs the update software. After that, when the software update unit 302 receives from the in-vehicle equipment 23 the rollback instruction, it restores the update target software to a state immediately before the starting of the installation processing by returning the backed up data.

Further, validating the software may be realized by restarting the software for which the processing of installing the update software has been performed. In this case, the software update unit 302 does not start up the software in a state at which the installation processing has completed, in the installation processing of the update software. After that, when receiving the validation instruction from the in-vehicle equipment 23, the software update unit 302 validates the update target software by starting up the software in a state at which the installation processing has completed.

In the present embodiment, it is assumed that a communication security between the in-vehicle equipment 23 and the ECU 24 is secured. When the communication security between the in-vehicle equipment 23 and the ECU 24 is not secured, the communication security between the in-vehicle equipment 23 and the ECU 24 may be secured by attaching a signature to communication data, similarly to the communication between the in-vehicle equipment 23 and the update server 22.

Figure 14:
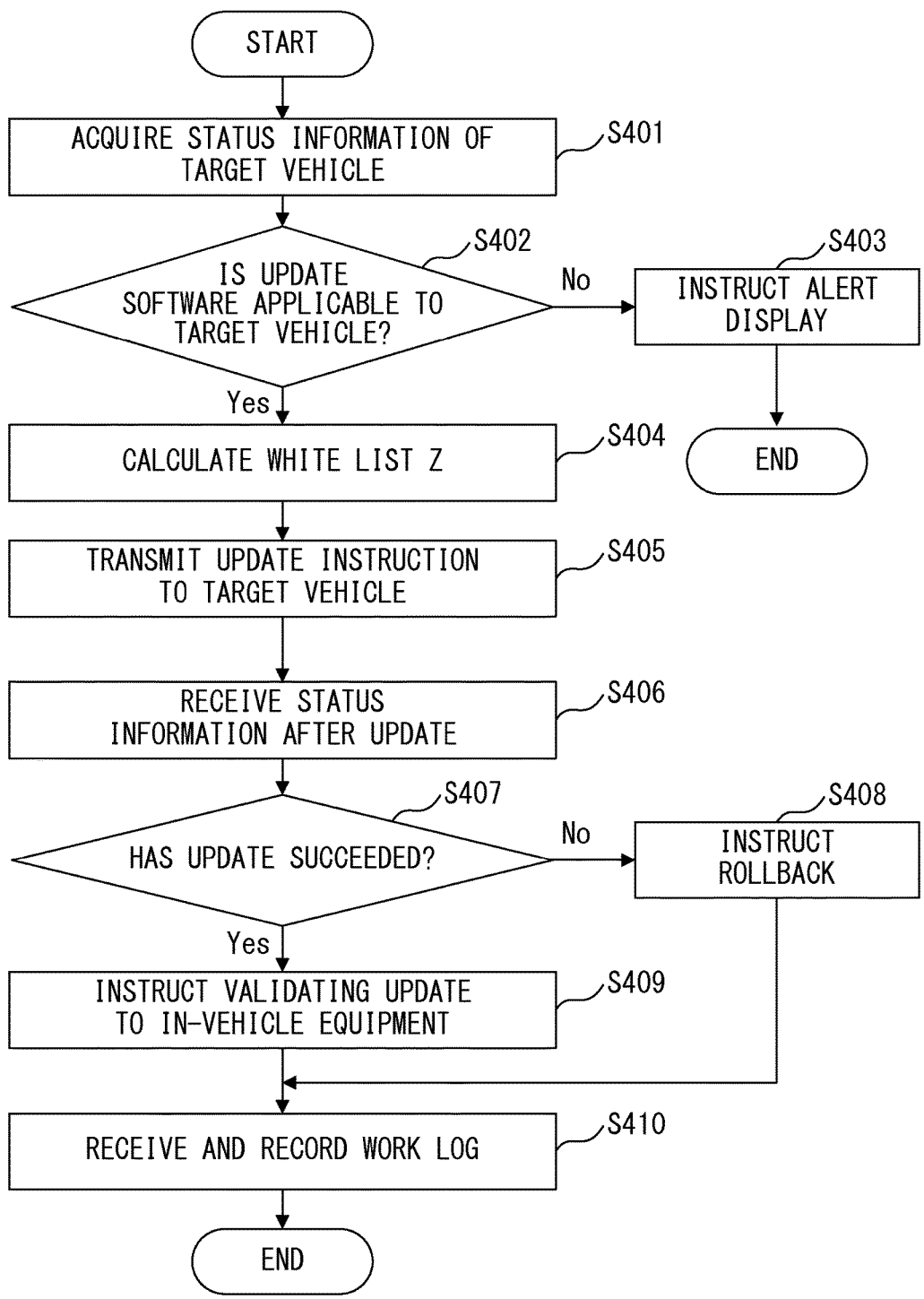
FIG. 14 is a flowchart which illustrates a processing content of an update server.

Next, explanations are given for the operational flow of the update server 22. FIG. 14 is a flowchart which illustrates a processing content of the update server 22.

In the flow of FIG. 14, first, the status information acquiring unit 33 transmits, to the in-vehicle equipment 23, the request to acquire the status information 70 of the target vehicle, and as a response to the acquisition request, the status information acquiring unit 33 receives the status information 70 (S401). When receiving the status information 70, the authentication unit 32 authenticates the in-vehicle equipment 23 that is the transmission source of the status information 70, and confirms that confidentiality of the status information 70 is secured.

Next, the decision unit 34 decides whether or not the update software is applicable to the target vehicle (S402) on the basis of the status information 70. When the decision unit 34 decides that the update software is not applicable to the target vehicle (No in S402), the decision unit 34 instructs the in-vehicle equipment 23 of the target vehicle to display an alert (S403). Then the processing ends.

On the other hand, in S402, when the decision unit 34 decides that the update software is applicable to the target vehicle (Yes in S402), the management unit 31 calculates the white list Z (60) on the basis of the status information 70 (S404).

Next, the decision unit 34 transmits the update instruction 80 to the target vehicle, and transmits the update instruction 80 of the software of the ECU 24 of the target vehicle (S405). In transmitting the update instruction 80, a signature is attached for securing confidentiality of the update software.

Next, the verification unit 36 receives from the target vehicle the status information 70 after the update (S406). When receiving the status information 70, the verification unit 36 authenticates the in-vehicle equipment 23 that is the transmission source of the status information 70 and confirms that confidentiality of the status information 70 is secured.

Next, the verification unit 36 decides whether or not the update of the software of the target vehicle has succeeded, on the basis of the status information 70 after the update and the white list Z (60) (S407). When the verification unit 36 decides that the update of the software has failed (No in S407), it transmits the rollback instruction to the in-vehicle equipment 23 as the final instruction (S408). Then, the processing transitions to S410.

On the other hand, when the verification unit 36 decides that the update of the software has succeeded (Yes in S407), it transmits the instruction to the in-vehicle equipment 23 to validate the update of the software as the final instruction (S409).

Then, the history management unit 38 receives the work log from the in-vehicle equipment 23, and stores the received work log in a specified storage region (S410). Then, the processing ends.

Figure 15:
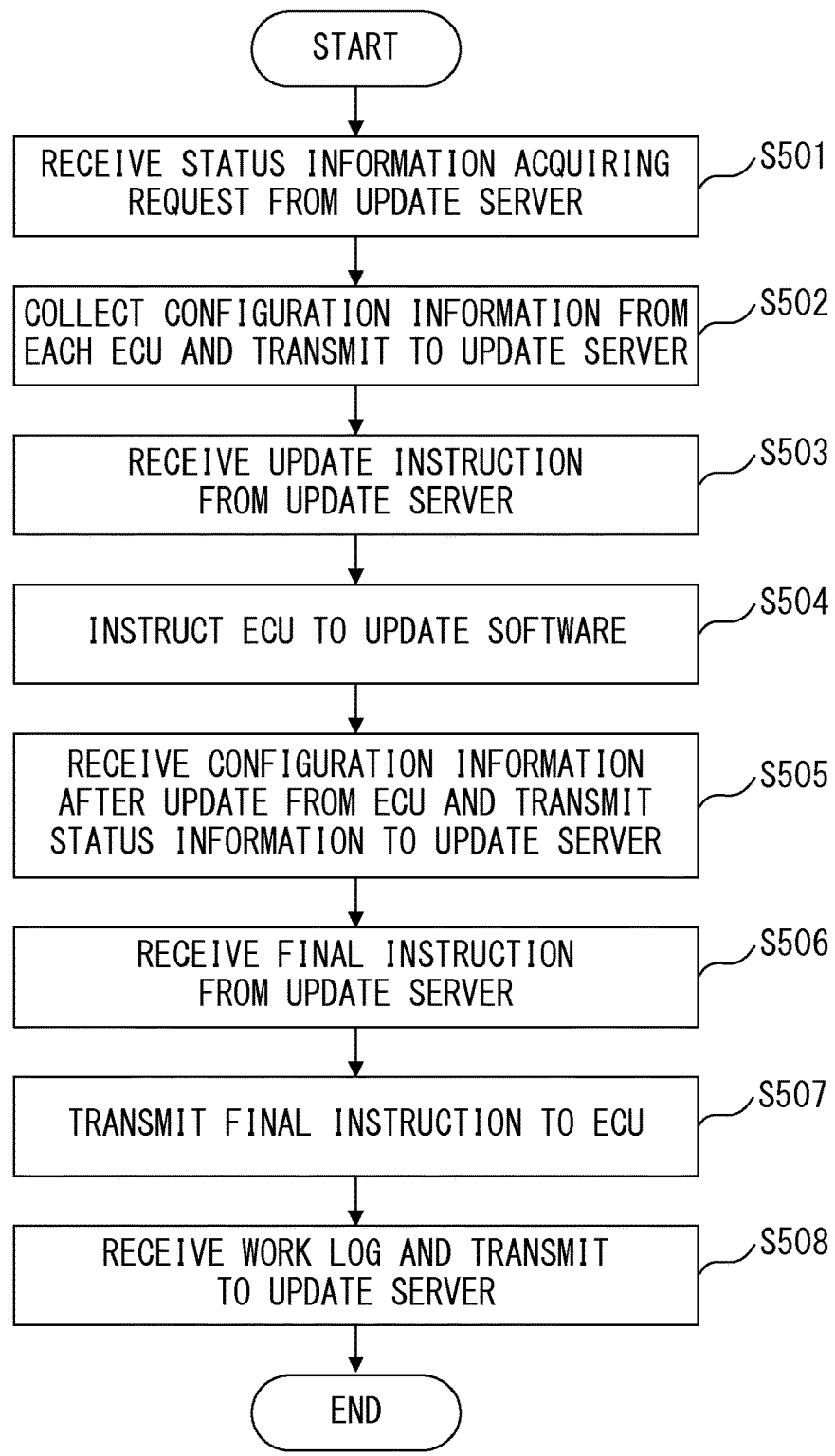
FIG. 15 is a flowchart which illustrates a processing content of in-vehicle equipment.

Next, explanations are given for the operational flow of the in-vehicle equipment 23. FIG. 15 is a flowchart which illustrates a processing content of the in-vehicle equipment.

In the flow of FIG. 15, first, the configuration information collection unit 203 receives a request to acquire the status information 70 from the update server 22 (S501). When receiving the request to acquire the status information 70, the server authentication unit 202 authenticates the update server 22 that is the transmission source of the acquisition request.

Next, the configuration information collection unit 203 collects the configuration information, from all of the ECUs 24 that are loaded into the vehicle, prepares the status information 70 on the basis of the collected configuration information, and transmits it to the update server 22 (S502). In transmitting the status information 70, the server authentication unit 202 attaches a signature for authenticating the transmission source and securing confidentiality of the status information 70, and transmits the status information 70.

Next, the update software application unit 204 receives, from the update server 22, the update instruction 80 of the software that includes the update software (S503). When receiving the update instruction 80 of the software, the server authentication unit 202 authenticates the update server 22 that is the transmission source of the update instruction, and confirms that confidentiality of the received update instruction 80 is secured.

Next, the update software application unit 204 transmits the update instruction together with the update software to each ECU 24 in which the update target software is operating (S504).

Next, the configuration information collection unit 203 receives the configuration information after the update from the ECU 24 to which the update instruction has been given in S504, prepares the status information 70 on the basis of the configuration information after the update, and transmits it to the update server 22 (S505). In collecting information of S505, the configuration information may be acquired from all of the ECUs 24.

Next, the update software application unit 204 receives from the update server 22 the final instruction 85 (S506). When receiving the final instruction 85, the server authentication unit 202 authenticates the update server 22 that is the transmission source of the final instruction 85, and confirms that confidentiality of the received final instruction is secured.

Next, the update software application unit 204 transmits the final instruction to each of the ECUs 24 instructed by the final instruction 85 (S507).

Next, the update software application unit 204 receives from each ECU 24 the work log and transmits it to the update server 22. Further, the update software application unit 204 may output, to the display device, for example, the processing result of the final instruction included in the work log (S508). Then, the processing ends.

Figure 16:
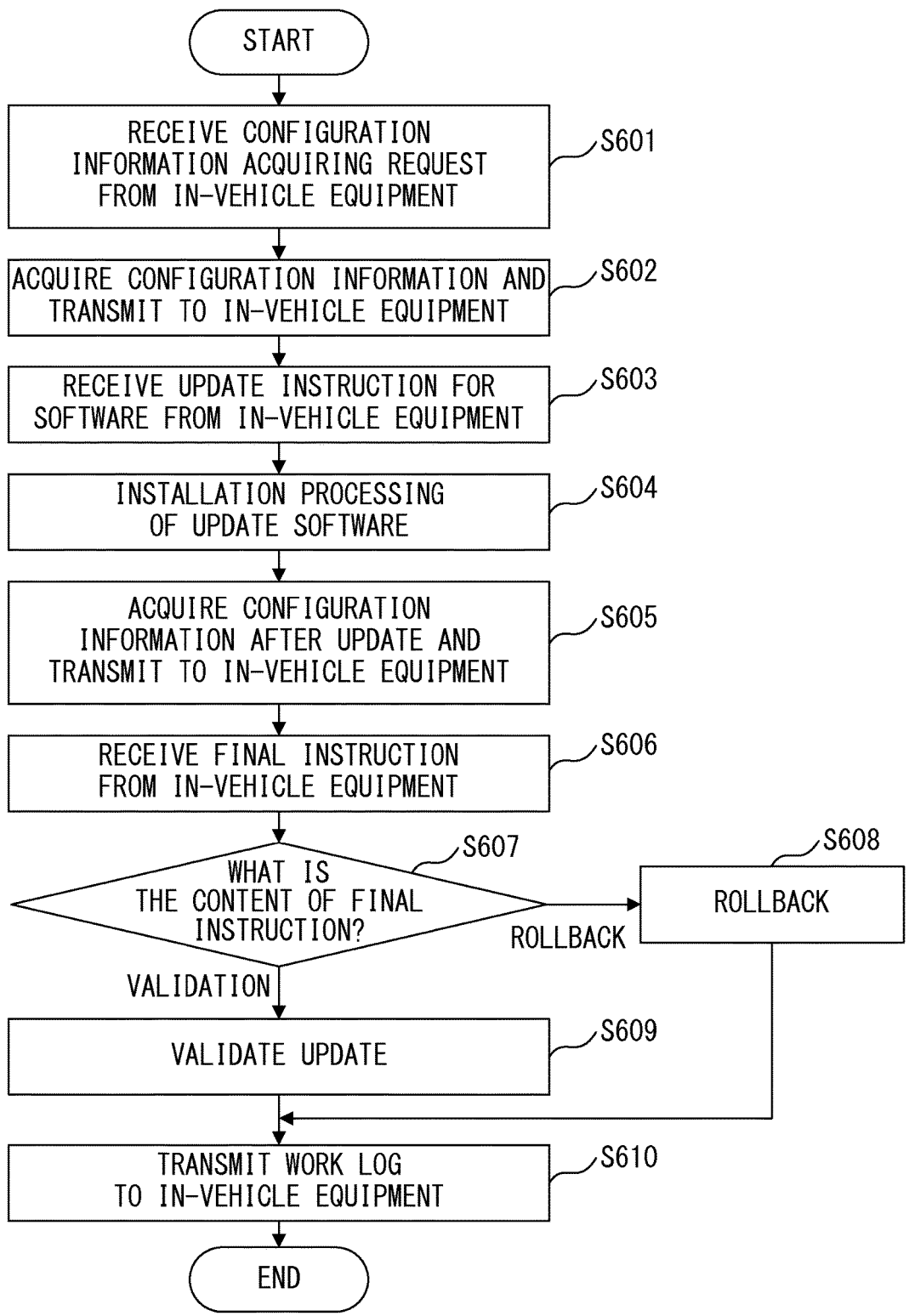
FIG. 16 is a flowchart which illustrates a processing content of an ECU.

Explanations are given for an operational flow of the ECU 24. FIG. 16 is a flowchart in which the processing content of the ECU 24 is illustrated.

In the flow of FIG. 16, first, the configuration information acquiring unit 301 receives a configuration information acquiring request from the in-vehicle equipment 23 (S601).

Next, the configuration information acquiring unit 301 collects the configuration information of all the software that operates in the ECU 24 and transmits the collected configuration information to the in-vehicle equipment 23 (S602).

Next, the software update unit 302 receives the update instruction from the in-vehicle equipment 23 (S603). Then, the software update unit 302 performs processing of installing the update software (S604). When the processing of installing the software has completed, the configuration information acquiring unit 301 collects the configuration information of the software for which the processing of installation has completed and transmits it to the in-vehicle equipment 23 (S605).

Next, the software update unit 302 receives a final instruction from the in-vehicle equipment 23 (S606). The software update unit 302 confirms the content of the final instruction (S607) and when the instruction content is rollback (rollback in S607), performs rollback of the software (S608). Then, the processing transitions to S610.

On the other hand, when the instruction content is validation of the update (validation in S607), the software update unit 302 validates the software (S609). After that, the software update unit 302 transmits the work log to the in-vehicle equipment (S610). Then, the processing ends.

Next, explanations are given for a configuration of the update server 22. FIG. 17 illustrates an example of a hardware configuration of the update server 22.

The update server 22 includes a CPU (Central Processing Unit) 401, a memory 402, a storage device 403, a reading device 404, a communication interface 405, and an input and output device 406. The CPU 401, the memory 402, the storage device 403, the reading device 404, the communication interface 405, and the input and output device 406 are connected via a bus.

The CPU 401 provides a part or all of the functions of the management unit 31, the authentication unit 32, the status information acquiring unit 33, the decision unit 34, the selection unit 35, the verification unit 36, and the history management unit 38, by utilizing the memory 402 and executing the program in which the operational procedure of the above mentioned flowchart is described.

The memory 402 is a semiconductor memory, for example, and is configured to include the RAM (Random Access Memory) region and ROM (Read Only Memory) region. The storage device 403 is a hard disk, for example, and provides a part or all of the functions of the storage unit 37. The storage device 403 may be a semiconductor memory, such as flash memory, and the like. The storage device 403 may also be an external storage device.

The reading device 404 accesses the removable storage medium 450 in accordance with the instruction of the CPU 401. The removable storage medium 450 is realized, for example, by a semiconductor device (e.g., a USB memory), a medium in which information is input and output by a magnetic action (e.g., a magnetic disk), a medium in which information is input and output by an optical action (e.g., a CD-ROM and a DVD), and the like. The reading device 404 does not need to be included in the update server 22.

The communication interface 405 is connected to the in-vehicle equipment 23 and exchanges data with the in-vehicle equipment 23 via a network in accordance with the instruction of the CPU 401. Further, the communication interface 405 may be connected to other information processors. The update software is acquired for example by the management unit 31 via the communication interface 405.

The input and output device 406 is, for example, a device that receives the instruction from the user, a display device that displays information, and the like. The input and output device 406 does not need to be included in the update server 22.

The program according to the present embodiment may be provided to the update server 22 in the following forms.
(1) Installed in the storage 403 beforehand.
(2) Provided by the removable storage medium 450.
(3) Provided from the program server (not illustrated) via the communication interface 405.

Further, a part of the update server 22 of the present embodiment may be realized by hardware. Alternatively, the update server 22 of the present embodiment may be realized by a combination of software and hardware.

Next, explanations are given for the configuration of the in-vehicle equipment 23. FIG. 18 illustrates an example of a hardware configuration of the in-vehicle equipment.

The in-vehicle equipment 23 includes a CPU 501, a memory 502, a storage device 503, a reading device 504, a communication interface 505, an output device 506, and a TPM 507. The CPU 501, the memory 502, the storage device 503, the reading device 504, the communication interface 505, the output device 506, and the TPM 507 are connected via a bus and the like.

The CPU 501 provides a part or all of the functions of the server authentication unit 202, the configuration information collection unit 203, and the update software application unit 204, by utilizing the memory 502 and executing the program in which the operational procedure of the above-mentioned flow chart is described.

The memory 502 is a semiconductor memory, for example, and is configured to include the RAM region and ROM region. The storage device 503 is a hard disk, for example, provides a part or all of the functions of the authentication information storage unit 201, and stores the program of the present embodiment. The storage device 503 may be a semiconductor memory, such as a flash memory and the like. The storage device 503 may be an external storage device.

The reading device 504 accesses the removable storage medium 550 in accordance with the instruction of the CPU 501. The removable storage medium 550 is realized, for example, by a semiconductor device (e.g., a USB memory), a medium in which information is input and output by a magnetic action (e.g., a magnetic disk), a medium in which information is input and output by an optical action (e.g., a CD-ROM and a DVD), and the like. The reading device 504 does not need to be included in the in-vehicle equipment 23.

The communication interface 505 is connected to the update server 22 and exchanges data via a network in accordance with the instruction of the CPU 501. Further, the communication interface 505 is connected to the ECU 24 and exchanges data via a network in accordance with the instruction of the CPU 501.

The output device 506 is, for example, the display device which displays information. The alerts to the user or the update results of the update software are output to the output device 506.

The TPM 507 is a security chip which may check the reliability of the program that is operated in the CPU 501 and provides a part of or all of the functions of the reliability checking unit 205. The hash value used by the reliability checking unit 205 in checking the authenticity of the application is stored in the specified memory region in the TPM 507.

The program according to the present embodiment is provided to the in-vehicle equipment 23 in the following forms, for example.
(1) Installed in the storage 503 beforehand.
(2) Provided by the removable storage medium 550.
(3) Provided from the program server (not illustrated) or the update server 22 via the communication interface 505.

Further, a part of the in-vehicle equipment 23 according to the present embodiment may be realized by hardware. Alternatively, the in-vehicle equipment 23 according to the present embodiments may be realized by a combination of software and hardware.

Figure 19:
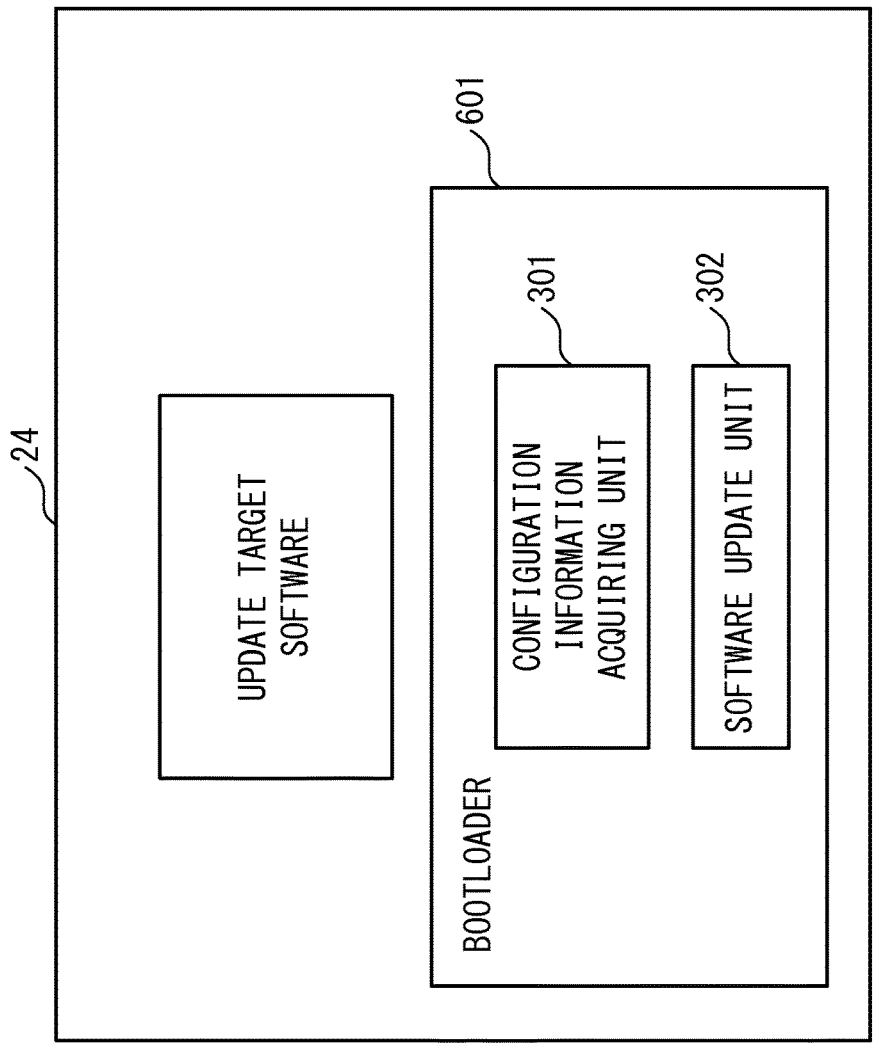
FIG. 19 illustrates an example (No. 1) of a method for realizing an update function of software of an ECU.
Figure 20:
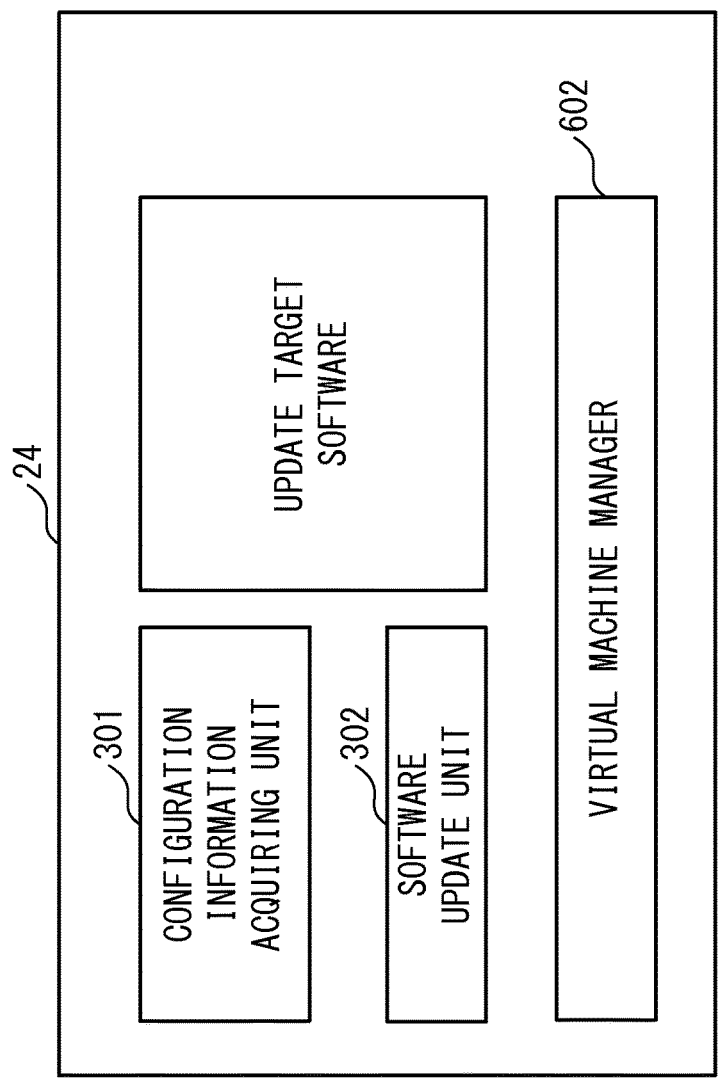
FIG. 20 illustrates an example (No. 2) of a method for realizing an update function of software of an ECU.

Next, explanations are given for a method for realizing the update function of the software of the ECU 24. FIG. 19 and FIG. 20 illustrate an example of a method for realizing the update function of the software of the ECU.

At the ECU 24 in FIG. 19, the bootloader 601 realizes the functions of the configuration information acquiring unit 301 and the software update unit 302. In the case of this example, the update operation of the software is performed prior to the start-up of the update target software. Namely, after the processing of installing the update software for the update target software is performed, the update target software is started up to validate the update. Accordingly, in FIG. 16, a configuration may be made such that the update target software is not started up until the point in time at which the processing of installing the update software is performed in S604 to S608, and such that the update software is started at a time when the update is validated in S609.

On the other hand, the virtual machine manager 602 is operating at the ECU 24 in FIG. 20, and the functions of the configuration information acquiring unit 301 and the software update unit 302 are realized by a virtual machine on the virtual machine manager. Further, by making the update target software operate by the virtual machine, the installation software that has the same configuration as that of the update target software during operations may be operated. And in FIG. 16 a configuration may be made such that the processing of installing the update software of S604 is performed on the software for the update, and in the validation of the update of S609, the virtual machine during operations may be switched to the installation virtual machine. In this case, when performing processing of rollback of S608, the installation virtual machine may be discarded.

Modified Example

A configuration may also be made such that a TPM is loaded onto each ECU 24 of the automobile 21 and such that the in-vehicle equipment 23 is not interposed in the communications between the update server 22 and the ECU 24.

Figure 21:
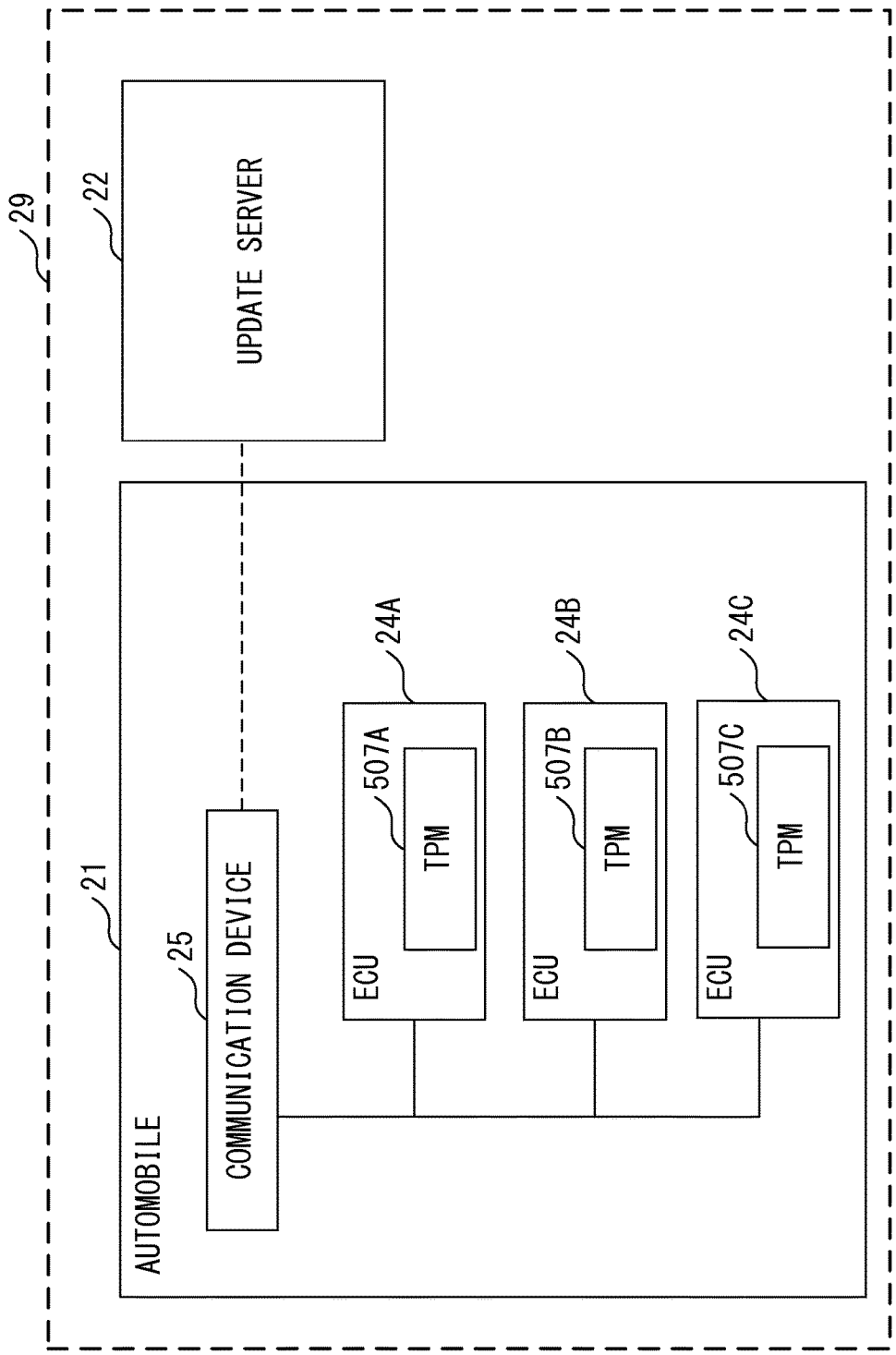
FIG. 21 illustrates an example of a configuration of a modification example of an information processing system.

FIG. 21 illustrates an example of a configuration of a modified example of an information processing system. The difference with the first embodiment of the information processing system 29 as illustrated in FIG. 21 is that each ECU 24 communicates with the update server 22 without interposing the in-vehicle equipment 23. Each function of the in-vehicle equipment 23 according to the first embodiment is incorporated in each ECU 24 in the second embodiment. However, since the update server 22 directly communicates with the ECU 24, the functions of the configuration information collection unit 203 may be omitted. The TPMs 507A, 507B, and 507C are included in each of the ECUs 24A, 24B, and 24C, respectively.

The present embodiment is not limited to the embodiment mentioned so far above, and may be configured or embodied within the range of not departing from the gist of the present embodiment.

According to an embodiment, the update server that transmits and applies the update software to the automobile may provide a method for confirming the success or failure of the application of the update software.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for confirming a correction program executed by a computer, the method comprising:
receiving, by the computer, first information that includes a value for confirmation of authenticity and a version identity of a control program from a control unit, the control unit being loaded onto the automobile, the control program being held by each of a plurality of equipment connected to the control unit via a network or a bus;
selecting, by the computer from among a plurality of control programs based on the first information, a first correction target control program, for which at least one of the authenticity and the version identity is not maintained, and a second correction target control program that defines an output value from the correction target control program as input;
determining, by the computer based on the first information and the first and second correction target control programs, correction programs to be applied to the first and second correction target control programs;
calculating, by the computer, second information that includes a first set of hash values respectively calculated from the control programs when the correction programs have been applied respectively to the first and second correction target control programs held by each of the plurality of equipment;
transmitting, by the computer, the correction target control programs to the control unit;
receiving, by the computer, from the control unit, third information that includes a second set of hash values respectively calculated from the correction target control programs after applying the correction programs to the first and second correction target control programs held by each of the plurality of equipment;
comparing, by the computer, the second set of hash values included in the third information with the first set of hash values included in the second information for the correction target control programs;
judging, by the computer in accordance with a result of the comparing, that the applying of the correction programs to the first and second target control programs has succeeded when all of the second set of hash values match all of the first set of hash values, or when a first subset of the first set of hash values that correspond to travel target control programs that affect travel by the automobile match a second subset of the second set of hash values that correspond to the travel target control programs;
transmitting, by the computer, to the control unit an instruction to validate each of the first and second target control programs to which the correction programs have been applied, when the applying of the correction programs to the first and second target control programs has succeeded; and
transmitting, by the computer, to the control unit an instruction to roll back the applying of the correction programs, when the applying of any of the correction programs to the first and second target control programs has failed.

2. The method according to claim 1, wherein the first information and the third information are prepared by software for which authenticity is confirmed.

3. The method according to claim 2, wherein the first information and the third information are prepared by the software for which authenticity is confirmed by a function loaded onto a Trusted Platform Module.

4. The method according to claim 1, the method further comprising:
transmitting to the control unit an instruction to validate updated control programs to which the correction target control programs have been applied, when the applying of the correction target control programs to each of the plurality of equipment has succeeded.

5. The method for confirming a correction program executed by a computer according to claim 1,
further comprising deciding whether a state of the control program is normal based on the first information, and
wherein the transmitting includes transmitting the correction target control programs to each of the plurality of equipment when the state of the control program is normal.

6. A non-transitory computer-readable recording medium having stored therein a program for confirming a correction program for causing a computer to execute a process, the process comprising:
receiving first information that includes a value for confirmation of authenticity and a version identity of a control program from a control unit, the control unit being loaded onto the automobile, the control program being held by each of a plurality of equipment connected to the control unit via a network or a bus;
selecting, by the computer from among a plurality of control programs based on the first information, a first correction target control program, for which at least one of the authenticity and the version identity is not maintained, and a second correction target control program that defines an output value from the correction target control program as input;
determining, by the computer based on the first information and the first and second correction target control programs, correction programs to be applied to the first and second correction target control programs;
calculating second information that includes a first set of hash values respectively calculated from the control programs when the correction programs have been applied respectively to the first and second correction target control programs held by each of the plurality of equipment;
transmitting the correction target control programs to the control unit;
receiving from the control unit, third information that includes a second set of hash values respectively calculated from the correction target control programs after applying the correction programs to the first and second correction target control programs held by each of the plurality of equipment;
comparing the second set of hash values included in the third information with the first set of hash values included in the second information for the correction target control programs;
judging, in accordance with a result of the comparing, that the applying of the correction programs to the first and second target control programs has succeeded when all of the second set of hash values match all of the first set of hash values, or when a first subset of the first set of hash values that correspond to travel target control programs that affect travel by the automobile match a second subset of the second set of hash values that correspond to the travel target control programs; and rolling back application of the correction programs, when the applying of any of the correction programs to the first and second target control programs has failed.

7. The non-transitory computer-readable recording medium according to claim 6, wherein the first information and the third information are prepared by software for which authenticity is confirmed.

8. The non-transitory computer-readable recording medium according to claim 7, wherein the first information and the third information are prepared by the software for which authenticity is confirmed by a function loaded into a Trusted Platform Module.

9. The non-transitory computer-readable recording medium according to claim 6, the process further comprising:
   transmitting to the control unit an instruction to validate updated control programs to which the correction target control programs have been applied, when the applying of the correction target control programs to each of the plurality of equipment has succeeded.

10. An information processing apparatus, connectable to a control unit in an automobile, the control unit connected to each of a plurality of equipment in the automobile via at least one of a network and a bus, the information processing apparatus comprising:
   a processor configured
      to receive first information that includes a value for confirmation of authenticity and a version identity of a control program from the control unit of the automobile;
      to select from among the plurality of control programs based on the first information a first correction target control program, for which at least one of the authenticity and the version identity is not maintained, and a second correction target control program that defines an output value from the correction target control program as input;
      to determine, based on the first information and the first and second correction target control programs, correction programs to be applied to the first and second correction target control programs;
      to calculate second information that includes a first set of hash values respectively calculated from the control programs when the correction programs have been applied respectively to the first and second correction target control programs held by each of the plurality of equipment;
      to transmit the correction target control programs to the control unit;
      to receive from the control unit third information that includes a second set of hash values respectively calculated from the correction target control programs after applying the correction programs to the first and second correction target control programs to each of the plurality of equipment;
      to compare the second set of hash values included in the third information with the first set of hash values included in the second information for the correction target control programs and obtain a comparison result;
      to judge, in accordance with the comparison result, that the applying of the correction programs to the first and second target control programs has succeeded when all of the second set of hash values match all of the first set of hash values, or when a first subset of the first set of hash values that correspond to travel target control programs that affect travel by the automobile match a second subset of the second set of hash values that correspond to the travel target control programs; and
      to roll back application of the correction programs, when the application of any of the correction programs to the first and second target control programs has failed.

11. The information processing apparatus according to claim 10, wherein the first information and the third information are prepared by software for which authenticity is confirmed.

12. The information processing apparatus according to claim 11, wherein the first information and the third information are prepared by the software for which authenticity is confirmed by a function loaded into a Trusted Platform Module.

13. The information processing apparatus according to claim 10, wherein the processor is further configured to transmit an instruction to validate updated control programs to which the correction target control programs have been applied, when the application of the correction target control programs to each of the plurality of equipment has succeeded.

* * * * *